US009934530B1

(12) United States Patent
Iacono et al.

(10) Patent No.: US 9,934,530 B1
(45) Date of Patent: Apr. 3, 2018

(54) APPLICATION PROGRAMMING INTERFACES FOR COURIER SERVICES

(71) Applicant: Square, Inc., San Francisco, CA (US)

(72) Inventors: Jeffrey F. Iacono, San Francisco, CA (US); Derek Hammer, San Francisco, CA (US); Jesse L. Reiss, Berkeley, CA (US); Alexander Soong, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/283,092

(22) Filed: Sep. 30, 2016

(51) Int. Cl.
*G06Q 30/00* (2012.01)
*G06Q 30/06* (2012.01)
*G06Q 10/08* (2012.01)

(52) U.S. Cl.
CPC ..... *G06Q 30/0637* (2013.01); *G06Q 30/0611* (2013.01); *G06Q 30/0639* (2013.01); *G06Q 30/0641* (2013.01); *G06Q 10/083* (2013.01)

(58) Field of Classification Search
CPC .... G06Q 30/06–30/0645; G06Q 30/08; G06Q 50/01
See application file for complete search history.

(56) References Cited

U.S. PATENT DOCUMENTS 7,844,497 B2 * 11/2010 Phillips .................. G06Q 10/08 705/26.8
7,895,129 B2 * 2/2011 Phillips .................. G06Q 10/08 705/330
8,712,924 B2 * 4/2014 Marks .................... G06Q 10/08 705/26.1
9,269,103 B1 2/2016 Kumar et al.
9,552,564 B1 * 1/2017 Martenis .............. G06Q 10/083
2002/0188517 A1 * 12/2002 Banerjee ............ G06Q 30/0633 705/26.8
2014/0025524 A1 * 1/2014 Sims .................. G06Q 30/0639 705/26.3
2014/0297470 A1 * 10/2014 Ramadge ........... G06O 30/0613 705/26.41
2015/0142594 A1 * 5/2015 Lutnick ................ G06Q 20/202 705/21

(Continued)

OTHER PUBLICATIONS

Wisnewski, "Getting Started with IBM API Connect: Concepts and Architecture Guide," International Technical Support Organization International Business Machines Corporation, Sep. 8, 2016, 72pp. (Year: 2016).*

(Continued)

*Primary Examiner* — Adam L Levine
(74) *Attorney, Agent, or Firm* — Mattingly & Malur, PC

(57) ABSTRACT

A system and environment to enable entities to utilize courier services provided by a service provider are described herein. In some examples, the service provider exposes the courier services to a computing device associated with a merchant, buyer, and/or others using one or more Application Programming Interfaces (APIs) provided by the service provider. The one or more APIs may enable merchants and/or others to automatically integrate the courier services into technologies used by the merchants and/or others in order to facilitate delivery of items that are offered for acquisition by the merchants.

13 Claims, 12 Drawing Sheets

(56) References Cited

U.S. PATENT DOCUMENTS

| | | | | |
|---|---|---|---|---|
| 2015/0186869 | A1* | 7/2015 | Winters | G06Q 20/3255 705/26.81 |
| 2016/0180287 | A1 | 6/2016 | Chan et al. | |

OTHER PUBLICATIONS

International Search Report and Written Opinion for International Application No. PCT/US2017/053976, dated Dec. 5, 2017.

* cited by examiner

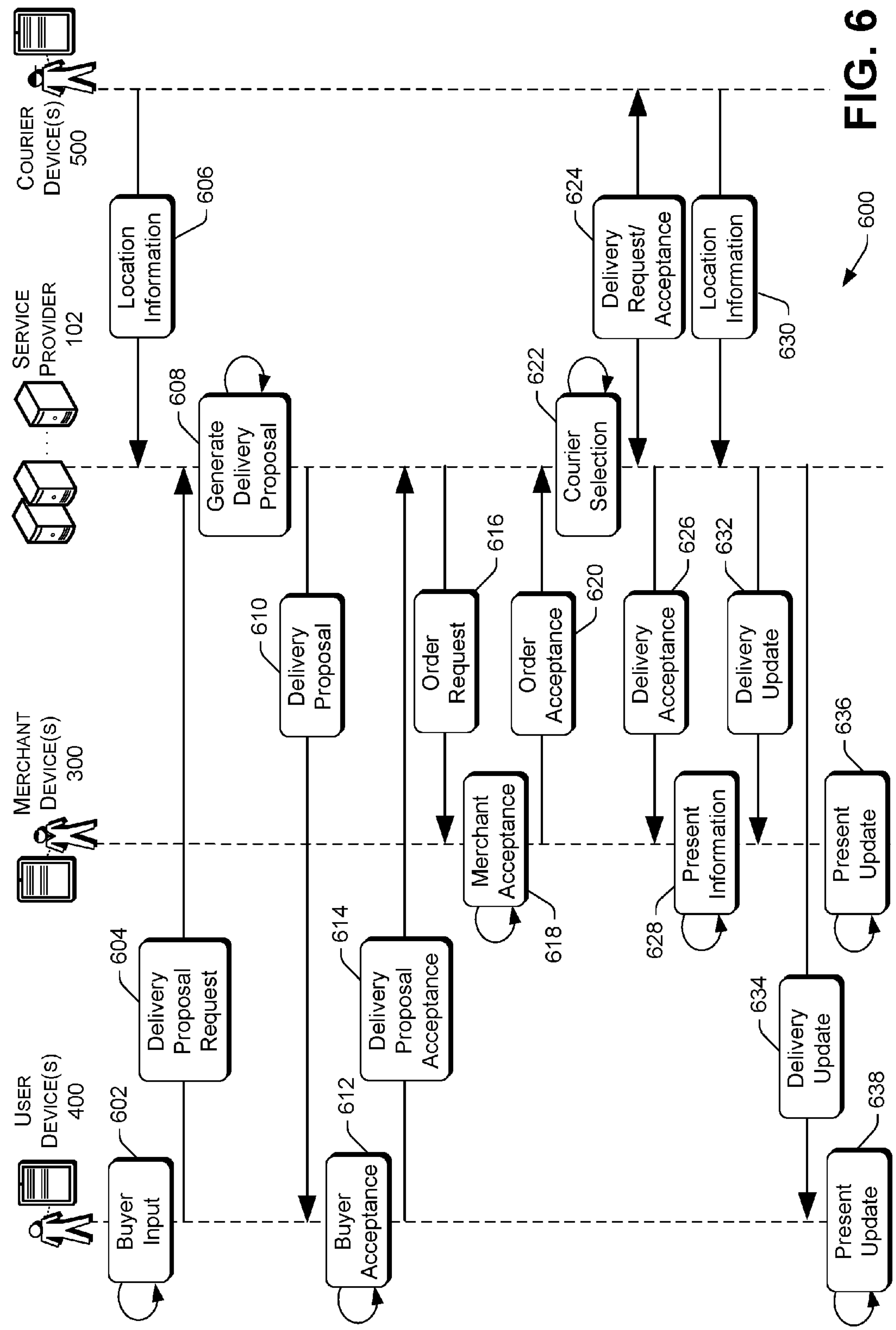

USER DEVICE(S) 400
MERCHANT DEVICE(S) 300
SERVICE PROVIDER 102
COURIER DEVICE(S) 500
Buyer Input
602
Delivery Proposal Request
604
Location Information
606
Generate Delivery Proposal
608
Delivery Proposal
610
Buyer Acceptance
612
Delivery Proposal Acceptance
614
Order Request
616
Merchant Acceptance
618
Order Acceptance
620
Courier Selection
622
Delivery Request/ Acceptance
624
Delivery Acceptance
626
Present Information
628
Location Information
630
Delivery Update
632
Delivery Update
634
Present Update
636
Present Update
638
600
FIG. 6

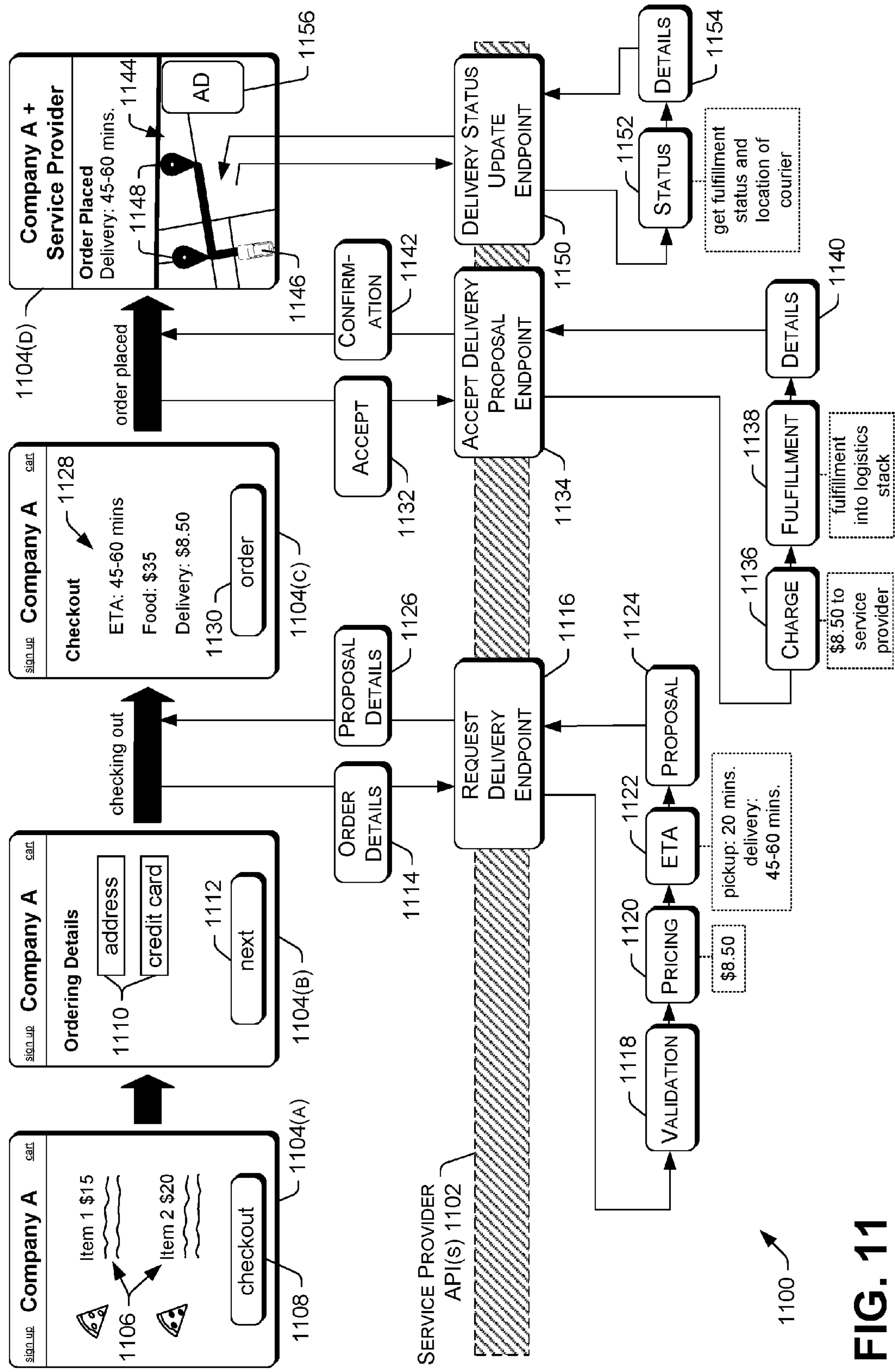
Company A
sign up
cart
Item 1 $15
Item 2 $20
1106
checkout
1108
1104(A)
Company A
Ordering Details
address
credit card
1110
next
1112
1104(B)
checking out
Company A
Checkout
ETA: 45-60 mins
Food: $35
Delivery: $8.50
1128
order
1130
1104(C)
order placed
Company A + Service Provider
Order Placed
Delivery: 45-60 mins.
1144
1148
1146
AD
1156
1104(D)
Order Details
1114
Proposal Details
1126
Accept
1132
Confirm-ation
1142
Request Delivery Endpoint
1116
Accept Delivery Proposal Endpoint
1134
Delivery Status Update Endpoint
1150
Service Provider API(s) 1102
Validation
1118
Pricing
1120
$8.50
ETA
1122
pickup: 20 mins. delivery: 45-60 mins.
Proposal
1124
Charge
1136
$8.50 to service provider
Fulfillment
1138
fulfillment into logistics stack
Details
1140
Status
1152
get fulfillment status and location of courier
Details
1154
1100
FIG. 11

APPLICATION PROGRAMMING INTERFACES FOR COURIER SERVICES

BACKGROUND

Buyers often use websites and other technologies to purchase items from merchants for delivery to the buyers. In some instances, a courier service may facilitate deliveries. For example, a courier service may provide an online site that identifies items from multiple merchants that are available for delivery by the courier service. A buyer may navigate to the online site, select an item from a merchant, specify an address for delivery, and purchase the item for delivery to the buyer's address. The courier service may utilize various technologies to fulfill delivery of the item to the buyer. In particular, the courier service may communicate with an electronic device associated with a merchant and/or an electronic device associated with a courier to deliver the item. However, in order for the merchants to be listed on the online site provided by the courier service, and ultimately offer items for acquisition through such site, the merchants are required to register with the courier service. This often includes providing extensive data about the merchant to the courier service. Further, the listing of the merchant on the online site associated with the courier service may disrupt other technologies that are employed by the merchant to offer items for acquisition, such as an online site provided by the merchant.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 6 illustrates an example sequence diagram of the techniques in the context of initiating an order at a user device.

FIG. 11 illustrates an example process of communicating via one or more APIs exposed by a service provider to use courier services provided by the service provider and track delivery of an order.

DETAILED DESCRIPTION

Figure 1:
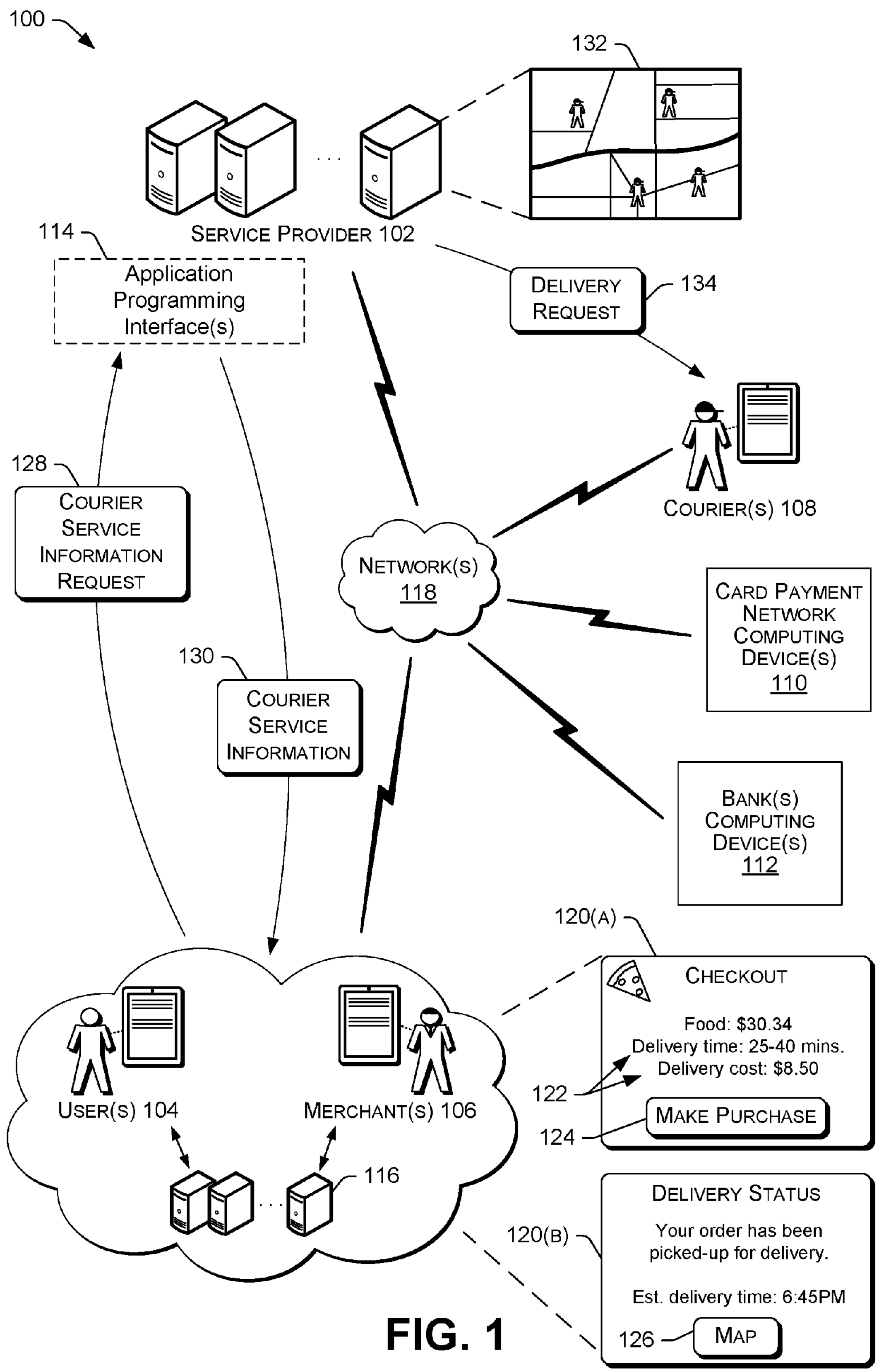
FIG. 1 illustrates an example architecture in which the techniques discussed herein may be implemented.

The technology described herein provides a system and environment to enable entities to utilize courier services provided by a service provider. In some examples, the service provider exposes the courier services to a computing device associated with a merchant, buyer, and/or others using one or more Application Programming Interfaces (APIs) provided by the service provider. In some instances, the service provider may be a third party that operates remotely and/or independently from the merchant, buyer, and/or others. The one or more APIs may enable merchants and/or others to automatically integrate the courier services into technologies used by the merchants and/or others in order to facilitate delivery of items that are offered for acquisition by the merchants. For example, the one or more APIs may allow entities to automatically access information regarding delivery of items by the courier service (e.g., courier costs, estimated delivery times, etc.), facilitate delivery of items by the courier service, and use a variety of other functionality provided by the service provider.

In many examples, the service provider operates a network of courier devices to deliver items to buyers and others. Each of the courier devices may implement a Global Positioning System (GPS) receiver or other location sensor to provide location information to the service provider. The service provider may track the locations of the courier devices to select a courier device for a delivery, send updates regarding delivery of items, or otherwise facilitate delivery of items by couriers. Additionally, or alternatively, the service provider may operate in cooperation with a plurality of merchant devices. Each of the merchant devices may implement a Global Positioning System (GPS) receiver or other location sensor to provide location information to the service provider. The service provider may use the locations of the merchant devices to facilitate delivery of items offered for acquisition by the merchants and perform other functionality.

As one example of the techniques discussed herein, an application may execute on a computing device associated with a merchant, buyer, and/or others. The application may provide a user interface to enable an individual (e.g., merchant, buyer, etc.) to place an order for an item offered for acquisition by the merchant. Through the user interface, the individual may select an item for acquisition and request that the item be delivered. For example, the individual may place an item in an electronic shopping cart for purchase and indicate an interest in having the item delivered. In some instances, the individual may specify a location of delivery, a location of pick-up, a requested time of pick-up, a number of items being acquired, a size of the item, whether or not the item is associated with a predetermined category, a weight of the item, and so on. In other instances, such information may be automatically determined, obtained from a user profile or merchant profile, and so on.

Upon determining that the individual has an interest in having the item delivered, the application may communicate with a third party service provider using an API provided by the service provider to facilitate delivery of the item by a courier service associated with the service provider. For example, the application may send a request for a cost of delivery of the item, an estimated amount of delivery time for the item, and so on. The service provider may generate a delivery proposal for using the courier services associated with the service provider to deliver the item to the buyer's location. The delivery proposal may include the cost of delivery, the estimated amount of delivery time, and/or other information regarding delivery of the item. The service provider may send the delivery proposal to the application for acceptance or rejection. In some instances, the application presents the information to the individual interacting with the user interface and the individual may provide input to accept or reject the proposal. In other instances, the application may operate according to one or more criteria to automatically accept or reject the delivery proposal (e.g., accept if the cost is below a threshold, accept if the estimated delivery time is below a threshold amount of time, etc.). In any event, the application may use the API to send an indication of acceptance or rejection of the delivery proposal to the service provider.

When the service provider is notified about an acceptance of a delivery proposal, the service provider may perform processing to select a courier for the delivery. For example, the service provider may track the locations of multiple courier devices over time and select a courier that satisfies one or more criteria, such as being within a particular distance to a pick-up location, being available to make a delivery, being associated with a transport vehicle that is able to transport the item, and so on. In some instances, the service provider may use a courier profile, user profile, merchant profile, or other information to select the courier. The service provider may then send a communication to the courier requesting that the courier obtain the item from an establishment of the merchant and transport the item to the location of delivery. During delivery of the item, the service provider may receive information from the courier and/or the merchant (e.g., location information, confirmation that delivery was picked up, etc.) and determine a status of the delivery. The service provider may send the status of delivery to the application, a merchant device, a buyer device, and/or others, so that an individual may be informed of a current state of the delivery.

In many instances, the techniques and environments described herein provide one or more APIs to access courier services provided by a service provider. That is, the one or more APIs may provide entities with a flexible structure to integrate courier services into technologies of the entities. As one example, a merchant may integrate courier services into a website or application operated by the merchant without creating additional components to implement the courier services. By doing so, the website or application may operate according to a thinner implementation (e.g., with less components), in comparison to a website or application that incorporates such features directly into the website or application. This may result in relatively fast implementation of the website or application. Further, the techniques and environments may allow courier services to be implemented across a large variety of contexts (e.g., devices, platforms, etc.). Moreover, the techniques and environments provide a flexible structure to modify the underlying technology used by the service provider to implement the courier services. In other words, the underlying technology of the courier services may be updated in a unified and/or simplified manner, without requiring an update to technologies implemented by merchants, buyers, and/or others. Additionally, the techniques and environments may allow the underlying technology used by the service provider (e.g., including the algorithms, cost schemes, etc.) to be maintained in a secure environment.

Further, the technology herein can allow any person with a mobile device to immediately become a courier, or cease to be a courier, in a courier network that provides delivery services for delivery of items from merchants to buyers. Through the interaction of computing devices, mobile devices, and location sensors, implementations herein can manage an unpredictable sharing ecosystem in which a large number of people are able to start serving as couriers, or cease serving as couriers, as necessary, to accommodate ever changing circumstances and conditions of the merchants, the buyers, the service region, and the couriers themselves. Consequently, the technology disclosed herein may enable efficient crowdsourcing of courier services in an on-demand manner from a varying group of people for providing a delivery service to merchants and buyers, and which can further enable buyers to minimize delivery expenses by combining orders to be delivered by the couriers.

This brief introduction is provided for the reader's convenience and is not intended to limit the scope of the claims. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example architecture 100 in which the techniques discussed herein may be implemented. The architecture 100 includes a service provider 102 that communicates with one or more users 104 (hereinafter "the user 104"), one or more merchants 106 (hereinafter "the merchant 106"), one or more couriers 108 (hereinafter "the courier 108"), one or more card payment network computing devices 110, and/or one or more bank computing devices 112 to perform a variety of processing. In many instances, the service provider 102 may provide one or more Application Programming Interfaces (APIs) 114 to enable the user 104 and/or the merchant 106 to access courier services provided by the service provider 102. Further, in many instances the service provider 102 may facilitate transactions between buyers and sellers, which may include communicating with the one or more card payment network computing devices 110 and/or the one or more bank computing devices 112. Each of the user 104, the merchant 106, and/or the courier 108 may be associated with a computing device. Further, in some instances the environment 100 includes an additional service provider (service provider 116) to communicate with the user 104 and/or the merchant 106 to facilitate the acquisition of an item, as discussed in further detail below. As illustrated, any of the computing devices of the architecture 100 may communicate with each other via one or more networks 118.

A merchant may include any business or entity engaged in the offering of goods or services for acquisition by buyers in exchange for compensation received from the buyers. Actions attributed to a merchant may include actions performed by employees or other agents of the merchant and, thus, no distinction is made herein between merchants and their employees unless specifically discussed. In addition, a buyer may include any entity that acquires goods or services from a merchant, such as by purchasing, renting, leasing, borrowing, licensing or the like. Hereinafter, goods and/or services may be referred to as items. An item may include a finished product, partially finished product, raw material, and so on. Thus, a merchant and a buyer may interact with each other to conduct a transaction in which the buyer acquires one or more items from a merchant, and in return, the buyer provides payment to the merchant.

A courier may include any entity engaged in delivering an item. A courier may generally obtain an item from a delivery pick-up location (e.g., a location of a merchant) and transport the item to a delivery drop-off location (e.g., a location of a buyer). Some implementations herein provide technological innovations that enable people to participate as couriers in a type of crowdsourced service. With such technology, essentially any person with a mobile device is able to immediately become a courier, or cease to be a courier, in a courier network that provides delivery services for delivery of items. For example, a user or a merchant may become a courier.

As noted above, the service provider 102 may expose the one or more APIs 114 to enable a computing device associated with the user 104 and/or the merchant 106 to access courier services provided by the service provider 102. For ease of description in the example of FIG. 1, the computing device associated with the user 104 and/or the merchant 106 will be referred to as "the item acquisition device." In the example of FIG. 1, the item acquisition device communicates with the service provider 102 through the one or more APIs 114 to facilitate delivery of an item. The item acquisition device displays various information received from the service provider 102 regarding delivery of the item through an item acquisition interface 120.

For example, the item acquisition device may communicate with the service provider 102 via the one or more APIs 114 while placing an order with the merchant 106. In particular, an individual (the user 104 and/or the merchant 106) may place an item in an online shopping chart for purchase and indicate an interest in having the item delivered. In response, the item acquisition device may send a request to the service provider 102 via the one or more APIs 114 for information regarding delivery. The service provider 102 may generate a delivery proposal regarding delivery of the item by courier services associated with the service provider 102 and send the delivery proposal to the item acquisition device. The item acquisition device may display information of the delivery proposal via the item acquisition interface 120(*a*) for acceptance or rejection. As illustrated in FIG. 1, an estimated amount of time to deliver the item and a delivery cost is presented at 122 in the item acquisition interface 120(*a*). The individual may accept the delivery proposal and cause the order to be placed by selecting a button 124.

Further, the item acquisition device may communicate with the service provider 102 via the one or more APIs 114 to obtain status updates regarding a delivery of an item. In such instances, the service provider 102 may monitor a location of a courier assigned to deliver the item (e.g., the courier 108), obtain information from a merchant that is selling the item (e.g., the merchant 106), and/or obtain other information. The service provider 102 may determine a status of delivery of the item and send the status of delivery to the item acquisition device. The status of delivery may be displayed via the item acquisition interface 120(*b*). The status may be determined and/or provided to the item acquisition device upon request from the item acquisition device (e.g., in response to a message sent through the one or more APIs 114), periodically, and/or upon the occurrence of another event. As illustrated in FIG. 1, the item acquisition interface 120(*b*) may include a button 126 which, when selected, displays a map that shows a current location of the assigned courier device, a route traveled by the assigned courier device, a route yet to be taken by the assigned courier device to pick up or deliver the item, and so on.

In the example of FIG. 1, a courier service information request 128 represents communications that are sent by the item acquisition device to the service provider 102 via the one or more APIs 114, while courier service information 130 represents communications sent back to the item acquisition device from the service provider 102. The courier service information request 128 may include a request for information regarding delivery of an item (e.g., cost estimate, delivery time estimate, etc.), an indication of acceptance/rejection of a delivery proposal, a request for information regarding a delivery status, and so on. The courier service information 130 may include a delivery proposal, information regarding a delivery status of an item, and so on.

In some instances, the item acquisition device may operate in cooperation with the service provider 116. The service provider 116 may provide resources that operate remotely and/or independently from the item acquisition device and/or the service provider 102. In one example, the service provider 116 may be associated with the merchant 106 to manage purchases, inventory, and/or perform other processing. The service provider 116 may provide an online site, operate in cooperation with a local application on the item acquisition device (e.g., desktop application, mobile application, etc.), and so on. To illustrate, the service provider 116 may provide an online web site for a pizza restaurant, so that customers (and/or the pizza merchant) may place orders for pizza with the pizza merchant. As such, communications that are sent and/or received by the item acquisition device to the service provider 102 may be routed through the service provider 116. In other words, the service provider 116 may act as an intermediary between the item acquisition device and the service provider 102. The service provider 116 may communicate with the service provider 102 via the one or more APIs 114. This may provide a seamless integration of the courier services offered by the service provider 102 into technologies associated with the merchant 106. In returning to the pizza restaurant illustration above, the website for the pizza restaurant may integrate the courier services of the service provider 102 by communicating with the service provider 102 via the one or more APIs 114. In some instances, this may occur without the customer knowing that the pizza restaurant is using such courier services (e.g., so that it appears that delivery is being provided by the merchant 106). In other instances, information may be communicated to the customer indicating that the courier services are being provided by the service provider 102 (e.g., a pop-up window indicating that the pizza will be delivered by Company X). Although many functions are described as being performed by the service provider 116, any of these functions may be performed by the service provider 102.

The service provider 102 may additionally, or alternatively, perform processing to manage couriers. For instance, the service provider 102 may communicate with the courier 108 to track a location of the courier 108, request delivery of an item, receive status information regarding a delivery (e.g., confirmation from the courier that an item was picked up or dropped off), and so on. In the example environment 100, the service provider 102 receives an indication of acceptance of a delivery proposal from the item acquisition device and selects a courier to deliver the item. As illustrated by a map 132, the service provider 102 may identify locations of multiple couriers and select a courier (the courier 108 in this case) to transport the item to a delivery location. The service provider 102 may then send a delivery request 134 to the courier 108 requesting delivery of the item and, in return, the courier 108 may send an indication of acceptance or rejection of the delivery request.

In some instances, the service provider 102 may cause payments to be made to any party within the environment 100. For example, the service provider 102 may cause funds from an account associated with the user 104 to be transferred to an account associated with the merchant 106 as payment for an item. Further, funds may be transferred from an account associated with the service provider 102, the merchant 106, and/or the user 104 to an account associated with the courier 108 for delivering the item. Payment may additionally be made to the service provider 102 for facilitating the transaction.

As noted above, the service provider 102 may communicate with the one or more card payment network computing devices 110 to conduct a transaction electronically. The one or more card payment network computing devices 110 may be associated with a card payment network (e.g., MasterCard®, VISA®, etc.). The service provider 102 may also communicate with the one or more bank computing devices 112 of one or more banks. For example, the service provider 102 may communicate with an acquiring bank, an issuing bank, and/or a bank maintaining user accounts for electronic payments.

An acquiring bank may be a registered member of a card association (e.g., Visa®, MasterCard®, etc.), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in a card payment network and may communicate with the computing devices of a card-issuing bank to obtain payment. Further, in some examples, a user may use a debit card instead of a credit card, in which case, the bank computing device(s) of a bank corresponding to the debit card may receive communications regarding a transaction in which the user is participating. Additionally, there may be computing devices of other financial institutions involved in some types of transactions or in alternative system architectures, and thus, the foregoing are merely several examples for discussion purposes.

The one or more card payment network computing devices 110 and/or the one or more bank computing devices 112 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

As noted above, the computing devices of the architecture 100 may communicate via the one or more networks 118. The one or more networks 118 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 118 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the architecture 100 may communicatively couple to the one or more networks 118 in any manner, such as by a wired or wireless connection.

The techniques discussed herein may be implemented in a variety of contexts and/or in a variety of manners. As one example, the techniques may be implemented with a merchant-facing component (e.g., application, online site, interface, etc. designed for a merchant). In this example, the merchant 106 may place an order for a customer. In particular, the customer may enter an establishment of the merchant 106, place a telephone call with the merchant 106, send a notification to the merchant 106 (e.g., email, text message, social media post, etc.), or otherwise communicate with the merchant 106. The merchant 106 may interact with the merchant-facing component (e.g., the item acquisition interface 120 designed for merchant use) to select an item identified by the customer and/or input other information provided by the customer (e.g., a delivery address, etc.). When a delivery proposal is received from the service provider 102, the merchant 106 may communicate the information of the delivery proposal to the customer (e.g., display a screen with a delivery cost, read the delivery cost from the item acquisition interface 120 to the customer, send a notification, etc.). Alternatively, the merchant 106 may refrain from providing the information of the deliver proposal to the customer. For instance, the merchant 106 may decide to offer the delivery for free to the customer, include the cost of delivery in a total cost of the order (e.g., without being itemized), and so on. In any event, the merchant 106 may accept or reject the delivery proposal and/or order the item based on a communication from the customer.

As another example, the techniques may be implemented with a customer-facing component (e.g., application, online site, interface, etc. designed for a customer). In this example, a customer may place an order directly with the merchant 106. In particular, the customer may navigate to an online site associated with the merchant 106, open an application associated with the merchant 106 (e.g., desktop application, mobile application, etc.), and so on, to place an order with the merchant 106. In some instances, the customer may view delivery information during the process (e.g., a delivery cost, estimated amount of time for delivery, etc.), while in other instances the information may not be shown to the customer or included within other information (e.g., a total cost of the order). Further, the customer may view a status update of a delivery through the customer-facing component.

As yet another example, the techniques may be implemented automatically without user input. In this example, information may not be displayed or otherwise communicated to an individual. For instance, one or more criteria may be established for acceptance/rejection of a delivery proposal, so that the delivery proposal is automatically accepted/rejected upon satisfying the one or more criteria. To illustrate, a delivery proposal may be accepted (or rejected) if a cost for delivery is below (or above) a threshold cost, an estimated amount of time of delivery is below (or above) a threshold amount of time, an estimated pick-up time for delivery is before (or after) a particular time, an estimated drop-off time for delivery is before (or after) a particular time, and so on. As such, in some instances, information regarding a delivery may not be displayed through the item acquisition interface 120.

Figure 2:
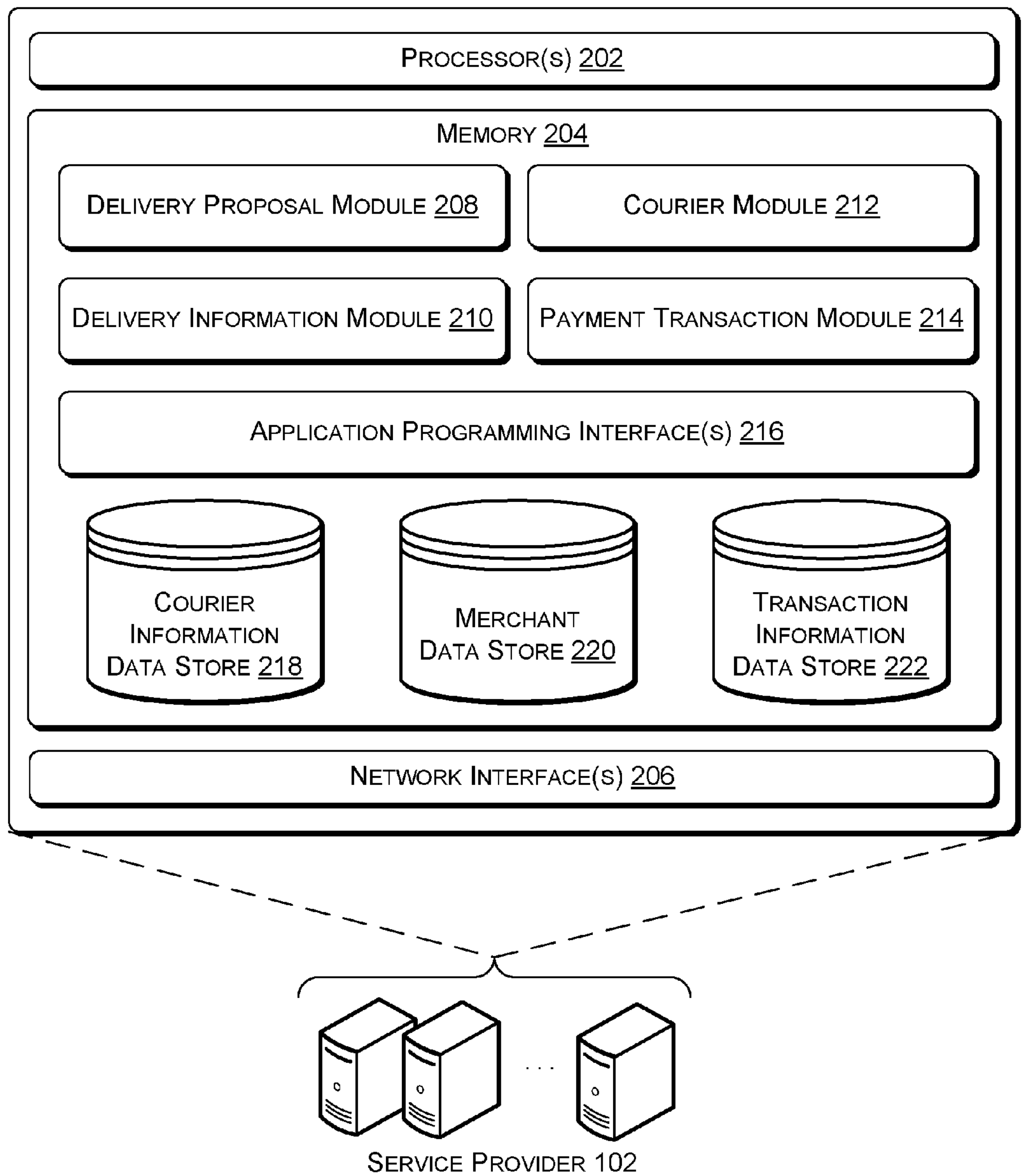
FIG. 2 illustrates example details of a service provider.

FIG. 2 illustrates example details of the service provider 102 of FIG. 1. The service provider 102 may be implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like. The one or more computing devices of the service provider 102 may include one or more processors 202, memory 204, and one or more network interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. As illustrated, the memory 204 may include a delivery proposal module 208, a delivery information module 210, a courier module 212, and a payment transaction module 214.

The delivery proposal module 208 may perform processing to generate a delivery proposal regarding delivery of an item by courier services associated with the service provider 102. In many instances, the service provider 102 may receive a request for a delivery proposal via one or more Application Programming Interfaces (APIs) 216 and, in response, generate a delivery proposal and send the delivery proposal to the requesting entity. Information included in a request for a delivery proposal is discussed in further detail below in reference to FIG. 3. The delivery proposal module 208 may generate a delivery proposal based on information included in a request for the delivery proposal, information about a courier stored in a courier information data store 218 or elsewhere (e.g., a current location of the courier, courier profile information, etc.), information about a merchant stored in a merchant data store 220 or elsewhere (e.g., a current location of the merchant, merchant profile information, etc.), information about a user (e.g., a current location of a user, a user profile, etc.), and so on.

Courier profile information may include (i) delivery history information for a courier indicating an average amount of time for the courier to perform deliveries (e.g., an average amount of time per mile, a total average amount of travel time, etc.), (ii) information indicating whether or not the courier is on-time for delivery pick-up and/or drop-off, etc., (iii) vehicle information indicating a vehicle or type of vehicle that is used by the courier to transport items (e.g., a bike, car, van, truck, etc.), (iv) historical location information indicating where the courier is typically located (e.g., a home address, an establishment where the courier is located more than a particular amount of time, etc.), and so on.

Merchant profile information may include (i) item preparation information indicating an amount of time (e.g., exact, average, estimated, etc.) to prepare an item or type of item for pick-up (e.g., cook an item, manufacture an item, etc.), (ii) item information regarding items that are offered for acquisition by a merchant (e.g., item identifier, information about an item cost/weight/volume/size/category, etc.), (iii) information regarding a package that is used by a merchant to transport an item (e.g., a size, shape, weight, volume, etc. of a delivery box), and so on.

Example information that may be part of a delivery proposal includes:

A cost of delivery for an item—a value for using the courier services of the service provider 102 to deliver an item (e.g., a $6 fee for a courier to pick up food from a restaurant and deliver it to a customer's location). A cost of deliver may vary based on factors, such as a characteristic of an item—a size, shape, weight, volume, type, etc. of the item (e.g., larger or heavier items may cost more, oddly shaped items may cost more (items that have a predetermined shape), fragile items may cost more than non-fragile items, etc.); information about a courier (e.g., cost may increase a distance from a courier to a pick-up location increases, cost may increase as a number of available couriers decreases, etc.); information about a preparation time of an item by a merchant (e.g., cost may increase (or decrease) as preparation time decreases (or increases), due to an urgency to have an item delivered); a location of pick-up (e.g., cost may increase as a distance from a particular point to a pick-up location increases); a location of drop-off (e.g., cost may increase as a distance from particular point to a drop-off location increases); a time of day (e.g., cost may increase during peak delivery times, such as in the evening); and so on.

An amount of time for delivery of an item (e.g., an estimated amount of time—delivery will take 20-30 minutes). The amount of time may generally be the time for a courier to retrieve an item and transport the item to the drop-off location. However, in some instances the amount of time may include a time to prepare the item by a merchant (e.g., the amount of time may include a total time from ordering an item until it arrives at a customer's location). An amount of time for delivery may vary based on factors, such as a characteristic of an item—a size, shape, weight, volume, type, etc. of the item (e.g., larger or heavier items may take more time to deliver, oddly shaped items may take more time to deliver (items that have a predetermined shape), fragile items may take more time than non-fragile items, etc.); information about a courier (e.g., an amount of time for delivery may increase as a distance from a courier to a pick-up location increases, an amount of time for delivery may increase as a number of available couriers decreases, etc.); a time of day (e.g., an amount of time may increase during peak travel times, such as during rush hour); and so on.

A pick-up time for delivery of an item (e.g., an estimated time of day, week, month, year, etc. when a courier will pick up the item). The pick-up time may be when the item is picked up from a merchant's location for delivery to a customer. In some instances, the pick-up time is a window of time (e.g., 2-2:30 PM). Further, in some instances a delivery proposal may include a deadline as to the latest time the courier would pick up the item. A pick-up time may vary based on factors, such as information about a courier (e.g., a pick-up time may move farther out as a distance from a courier to a pick-up location increases, a pick-up time moves farther out as a number of available couriers decreases, etc.); a time of day (e.g., a pick-up time moves farther out during peak delivery times, such as during rush hour); and so on.

A drop-off time for delivery of an item (e.g., an estimated time of day, week, month, year, etc. when a courier will drop off the item). The drop-off time may be when the item is dropped off at a customer's location. In some instances, the drop-off time is a window of time (e.g., 3-4 PM). A drop-off time may vary based on factors, such as a characteristic of an item—a size, shape, weight, volume, type, etc. of the item (e.g., larger or heavier items may take more time to deliver, oddly shaped items may take more time to deliver (items that have a predetermined shape), fragile items may take more time than non-fragile items, etc.), information about a courier (e.g., a drop-off time may move farther out as a distance from a courier to a pick-up location increases, a drop-off time may move farther out as a number of available couriers decreases, etc.); a time of day (e.g., a drop-off time moves farther out during peak delivery times, such as during rush hour); and so on.

A time at which a delivery proposal expires. In some instances, the delivery proposal may expire if not accepted by a particular time (e.g., time of day, day of week, month, year, etc.). As such, the delivery proposal may be associated with a time of expiration (e.g., tomorrow at 2 PM, 2 hours from receipt of the delivery proposal, etc.).

The delivery information module 210 may provide delivery information regarding progress of a delivery. For example, the delivery information module 210 may receive a request via the one or more APIs 216 for a delivery status update and, in response, generate information regarding a status of delivery and send the information to the requesting entity. In other examples, such information regarding the status of delivery may be generated and sent automatically and/or upon the occurrence of another event. The delivery information module 210 may generate information regarding a status of a delivery based on various information, such as a location of a courier, an indication from a courier regarding confirmation of pick-up of an item at a merchant's location and/or drop-off at a customer's location, a communication from a merchant indicating confirmation of pick-up, a communication from a merchant regarding a status of preparing an item (e.g., an amount of time left to cook a dish), and so on. As such, the delivery information module 210 may communicate with the courier module 212 to receive location information regarding couriers.

The courier module 212 may manage couriers. For example, the courier module 212 may track locations of couriers (before, during, and/or after delivery), select a courier for delivery, communicate with the courier to facilitate the delivery, provide updates regarding a status of delivery, predict courier travel times to various delivery locations for various times of the day and/or days of the week, and so on. To do so, the courier module 212 may analyze various information, such as information included in a request for a delivery proposal, information included in a request for a delivery status update, information about a courier stored in the courier information data store 218 or elsewhere (e.g., a current location of the courier, courier profile information, etc.), information about a merchant stored in the merchant data store 220 or elsewhere (e.g., a current location of the merchant, merchant profile information, etc.), information about a buyer (e.g., a current location of a buyer, a user profile), and so on. In some instances, the courier module 212 may manage couriers through activation, movement, positioning, and/or deactivation.

As one example, the courier module 212 may select a courier to transport an item from a merchant to a buyer. In some instances, a courier is selected in response to receiving an acceptance of a delivery proposal via the one or more APIs 216. In other instances, a delivery is arranged upon the occurrence of other events. The courier module 212 may use various information to select a courier, such as a location of the courier relative to a location of a merchant (e.g., select a courier that is closest to a pick-up location), an availability of the courier (e.g., select a courier that is available), a type of vehicle that is used by the courier to transport items (e.g., select a courier that is able to transport the type of item being delivered), information about an item being delivered (e.g., a size, shape, volume, type, etc.), and so on. The courier module 212 may then communicate with the selected courier to arrange the delivery. The service provider 102 may provide information regarding a number of items to transport, a location of a merchant (or multiple merchants, if multiple items are going to be delivered), a requested time of pick-up and/or drop-off, and so on. If it is determined that multiple trips are required for the delivery (e.g., due to a number of items being delivered, a size of items being delivered, a carrying capacity of a courier, etc.), the courier module 212 may inform a courier of the multiple trips and/or send instructions to multiple couriers to make the delivery. Further, the courier module 212 may inform a courier that a delivery that is not urgent and may be performed during a downtime period in which less than a threshold number of deliveries are scheduled for the courier. The courier module 212 may inform the courier of the time period (e.g., "perform the delivery between 8 pm and 10 pm any night this week") or the courier may make the delivery as time frees up throughout a day, week, etc. In many instances, the courier module 212 communicates with couriers through non-API channels and/or separate channels than the one or more APIs 216 used for exposing courier services to entities.

The payment transaction module 214 may facilitate payment transactions between merchants, users, and/or couriers. For example, the transaction module 214 may receive orders regarding transactions, process the transactions, generate and/or store transaction information regarding the transactions, and so on. During a transaction, a user (e.g., customer) may acquire an item from a merchant by purchasing, renting, leasing, borrowing, licensing, or the like. The item may refer to a good and/or a service offered by a merchant. When paying for the transaction, the user can provide the amount of payment that is due to the merchant. In some instances, the transaction may be processed by electronically transferring funds from a financial account associated with the user to a financial account associated with the merchant. In some examples, the transaction module 214 may be implemented by one or more computing devices that are configured to perform secure electronic financial transactions.

The payment transaction module 214 may facilitate payment transactions initiated through a variety of channels. As one example, a user may interact with a user device to place an order with a merchant. Here, the service provider 102 may communicate with the merchant to fulfill the order (e.g., inform the merchant that an order has been placed, ask the merchant to fulfill an order, etc.). As another example, a merchant may interact with a merchant device to place an order on behalf of a user. Here, the user may communicate with the merchant via telephone, in-person, a notification (e.g., text message, email, social media, etc.), and so on, to indicate a desire to place an order with the merchant. In any of these examples, a user may provide payment at any time, such as at the time of placing an order, while an item is being delivered, at the time of drop-off (e.g., interacting with a courier device), and so on.

A user may provide payment through various method, such as cash, check, a payment card, Near Field Communication (NFC), Bluetooth®, an account, electronic payment, and so on. In some instances, the payment transaction module 214 enables card-less payments for transactions between a user and a merchant based on interaction of the user with a user device and interaction of the merchant with a merchant device. Accordingly, in some examples, a card-less payment transaction may include a transaction conducted at a POS location during which an electronic payment account of the user is charged without the user having to physically present a payment card to the merchant at the POS location. Consequently, the merchant need not receive any details about the financial account of the user for the transaction to be processed. As one example, the electronic payment may be charged to a credit card issuer or credit card number that the user provided when signing up with the service provider 102 for an electronic payment account. As another example, the user may have a quantity of money pre-paid in an account maintained for use in making the electronic payments. Other variations will also be apparent to those of skill in the art.

In some instances, the payment transaction module 214 may store transaction information in a transaction information data store 222. The transaction information may be received from a merchant device, buyer device, courier device, and/or generated by the service provider 102. The transaction information may include information regarding the time, place and/or the amount of the transaction, information related to the item acquired (e.g., information identifying the item sold), a type of payment being used (e.g., cash, check, payment card, electronic payment, etc.), as well as additional information, such as buyer information. For instance, if a payment card is used, the transaction information can include data stored in the payment card (e.g., Track 1 data (cardholder name, card number and other card information)). In addition, when completing the transaction, a buyer may sometimes provide a receipt email address for receiving a receipt through email. Other examples of transaction information that can be captured include item information (e.g., an itemized listing of the items being acquired, the price being paid for each item, descriptors of the items (size, flavor, color, etc.)), geolocation data indicating a geographic Point of Sale (POS) location of a particular transaction, online/offline card data, data describing a merchant (e.g., a merchant identifier, a merchant category code (MCC), etc.), information included in a request for a delivery proposal, information included in a delivery proposal, any type of data that is received upon a buyer's authentication into a social network, and/or various other types of information. In some instances, transaction information may be used to store information about a merchant in the merchant data store 220 (e.g., a cost of an item offered by a merchant may be obtained from transaction information regarding a transaction at the merchant's establishment).

While FIG. 2 illustrates components and data of the service provider 102 as being present in a single location, these components and data may alternatively be distributed across different computing devices and/or different locations in any manner. Consequently, the functions may be implemented by one or more computing devices, with the various functionality described being distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

Figure 3:
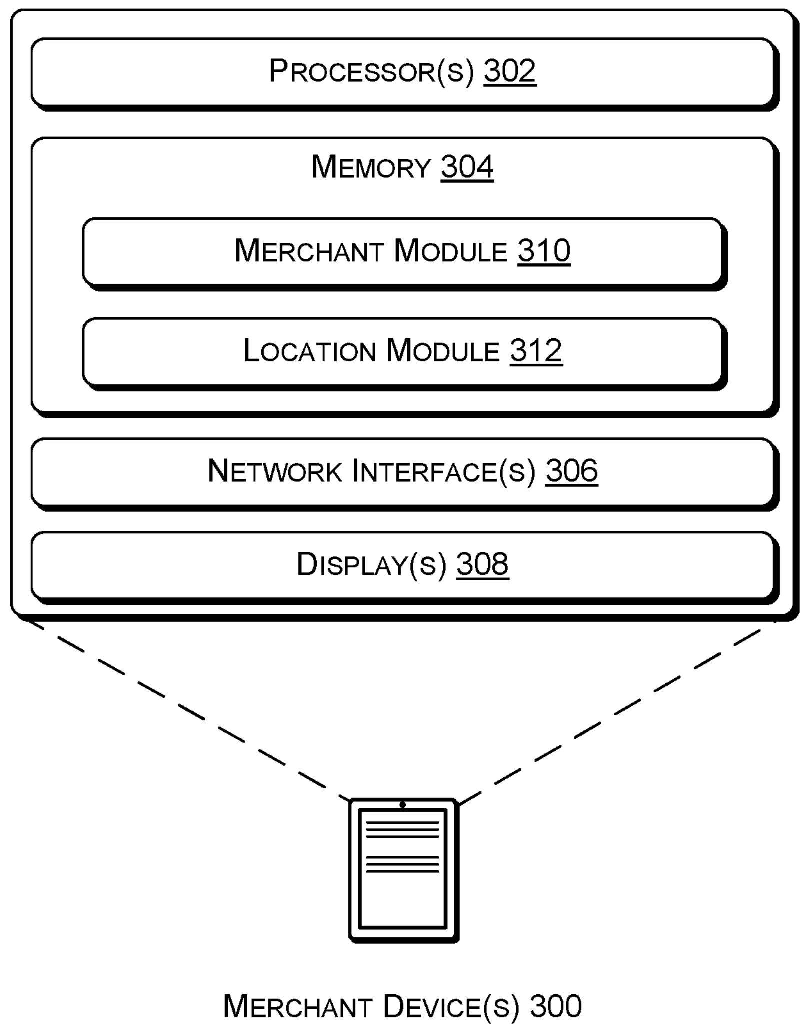
FIG. 3 illustrates example details of a merchant device.

FIG. 3 illustrates example details of a merchant device 300. For example, the merchant device 300 may be employed by the merchant 106 of FIG. 1. The merchant device 300 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the merchant device 300 may be a mobile device.

The merchant device 300 may include one or more processors 302, memory 304, one or more network interfaces 306, and one or more displays 308. The one or more processors 302 may include a central processing unit (CPU), a graphics processing unit (GPU), a microprocessor, a digital signal processor, and so on. The one or more displays 308 may include a touch screen, a Liquid-crystal Display (LCD), a Light-emitting Diode (LED) display, an organic LED display, a plasma display, an electronic paper display, or any other type of technology. Although not illustrated, the merchant device 300 may also include, or be associated with, other components, such as a camera(s), a microphone(s), a speaker(s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or another sensor. The merchant device 300 may additionally include, or be associated with, input device (s) such as a keyboard, a mouse, a pen, a voice input device, a touch input device, etc. The memory 304 may include a merchant module 310 and a location module 312.

The merchant module 310 (and/or the location module 312) may represent a merchant-facing component that may generally be used by a merchant. Although in some instances a customer may interact with the merchant-facing component (e.g., to confirm payment, provide delivery information, or provide other input). The merchant module 310 may perform various processes to assist a merchant in facilitating transactions with customers, managing deliveries, managing inventory, and so on. The merchant module 310 may provide various interfaces and/or dashboards. In some instances, the merchant module 310 may be referred to as an application, such as an item acquisition application.

The merchant module 310 may communicate with the service provider 102 to use courier services provided by the service provider 102. As one example, a merchant may interact with an item acquisition interface (e.g., the item acquisition interface 120) provided by the merchant module 310 to place an order for a customer. If the merchant module 310 determines that a delivery may be requested (e.g., automatic determination, based on the customer indicating a desire to have the order delivered, etc.), the merchant module 310 may generate a request for a delivery proposal and send the request to the service provider 102 via one or more APIs to request information regarding use of courier service provided by the service provider 102. The information of the request may be provided by the customer or the merchant, retrieved from a data source (e.g., a user profile, a merchant profile, etc.), and so on. Example information that may be part of a request for a delivery proposal includes:

A pick-up location for an item—a location where an item is retrieved from a merchant for delivery to a customer. The pick-up location may generally be a merchant's location (e.g., establishment), although any location may be used, such as a warehouse, residence, PO box, street corner, etc. The pick-up location may be stationary or mobile (e.g., in the case of a moving merchant).

A drop-off location (also referred to as the location of delivery)—a location where an item is delivered to a customer. The drop-off location may generally be a customer's location, such as a residence, PO box, street corner, establishment where a customer is currently located, etc. The drop-off location may be stationary or mobile (e.g., in the case of a moving customer).

A requested time of pick-up—a time of day, week, month, year, etc. to retrieve an item from a merchant for delivery. The requested time of pick-up may be a specific time, a window of time, and so on. In some instances, the requested time of pick-up may be as soon as possible (e.g., in the case when an item is already made or in other situations). If a pick-up time is not specified in a request for a delivery proposal, the service provider 102 may assume that the pick-up time is as soon as possible, for example.

A number of items being acquired—a quantity of items being purchased from a merchant. In some instances, the service provider 102 may use this information to determine a size of an order (e.g., how much space is needed to transport the order).

An item identifier identifying an item that is being acquired. In some instances, the service provider 102 may use this information to lookup information about the item to determine how much space is needed to transport the order, a type of vehicle that is needed to transport the item, a type of the item (e.g., fragile vs. non-fragile, perishable vs. non-perishable, etc.), and so on.

A characteristic of an item that is being acquired (e.g., size, shape, weight, volume, type, category, etc.). In some instances, the service provider 102 may use this information to determine how much space is needed to transport the item.

A tag associated with an item being acquired (e.g., a tag indicating a particular category). For example, an item may be tagged with a predetermined label that is associated with a category of food that requires special handling for delivery (e.g., pizza or soup, which may need to be kept warm and/or upright; catered food, such as food on a tray, which may require special handling; a television, which may need to be handled with care; etc.). In some instances, the service provider 102 may use this information to determine how much space is needed to transport the order, a type of vehicle that is needed to transport the item, a type of the item (e.g., fragile vs. non-fragile, perishable vs. non-perishable, etc.), and so on.

A value of an order (e.g., a cost of an item or order).

Pick-up instructions regarding an item. For example, a merchant may specify that a bicycle may be picked up for delivery at the back of a store.

Delivery instructions regarding an item. For example, a customer may request that the item be delivered between a particular window of time, at a particular spot on a customer's property, with a particular type of vehicle, by a particular courier, and so on.

Customer contact information (e.g., telephone number, email address, a customer's geolocation, etc.). As one example, customer contact information may include a customer's street address.

Although the merchant module 310 is discussed as providing the information included in a request for a delivery proposal, in some instances the information may be determined (at least in part) at the service provider 102 (e.g., the service provider 102 may receive an item identifier and lookup an item size, weight, etc.).

After submitting a request for a delivery proposal to the service provider 102, the merchant module 310 may receive the delivery proposal from the service provider 102. In some instances, information from the delivery proposal is conveyed to the customer. For example, the merchant may inform the customer of a cost of delivery, an estimated delivery time, and/or any other information. In other instances, information from the delivery proposal may not be presented to the customer. For example, the merchant may view the information of the delivery proposal and/or include the cost in a total cost of the order. As such, in some instances it may appear to the customer that the delivery is being handled by the merchant. In any event, the merchant module 310 may send an indication of acceptance or rejection of the delivery proposal to the service provider 102 via the one or more APIs.

Thereafter, the merchant module 310 may communicate with the service provider 102 via the one or more APIs to provide and/or receive information on a status of a transaction. For example, the merchant module 310 send information indicating where an item is in the preparation process (e.g., almost finished, done, entering the oven, bagged and ready for pickup, etc.). In another example, the merchant module 310 may receive information from the service provider regarding a status of delivery by courier services (e.g., a specific location of a courier, how far away a courier is, whether or not an item has been dropped off, courier is in-transit to the pick-up location, etc.).

The merchant module 310 may receive orders through various channels. For instance, the merchant module 310 may receive a first order that is placed by a merchant on behalf of a customer based on a telephone conversation between the merchant and the customer and a second order that is placed by another customer on a customer application. The second order may be received from the service provider 102 and/or another party, such as a service provider associated with the merchant. In any event, the orders may be managed by the same merchant module 310. That is, the merchant module 310 may monitor preparation of the orders, present information regarding a progress of preparation of the orders, present information regarding a delivery status of the orders, and so on. In many instances, information about the orders is presented through an interface with information that designates the orders as originating from different channels.

The merchant module 310 may apply one or more schemes to provide payment for courier services used by the service provider 102. As one example, cost of delivery for using the courier services of the service provider 102 may be billed to a customer (e.g., directly on an item-by-item basis, on a monthly basis, etc.). As another example, a merchant may decide to provide the payment for the cost of delivery (e.g., not charge the customer) in each instance or when one or more criteria are satisfied, such as an order having more than a threshold number of items, an order having an amount that is more than a threshold amount, the customer being associated with a particular status (e.g., the customer having paid for a monthly subscription for delivery services or having purchased a particular number of items over time), and so on.

A merchant may be billed by the service provider 102 for use of courier services in various manners, such as monthly, on an item-by-item basis, balancing an amount that is owed to the merchant by the service provider 102 (e.g., subtract costs for courier services from an amount the service provider 102 owes the merchant), and so on.

The merchant module 310 may additionally, or alternatively, perform other processing. In one example, the merchant module 310 may facilitate transactions with customers by accepting payment from customers (e.g., via a card reader, NFC connection to a customer device, Bluetooth® connection to customer device, etc.), providing receipts for items (including printing receipts), receiving input from customers for items being acquired by the customers (e.g., confirmation, signature for credit card, etc.), and so on. In another example, the merchant module 310 may enable a merchant to manage inventory by informing the merchant of inventory levels (e.g., number of items currently in-stock), order additional inventory, view notifications from the service provider 102 regarding inventory, offer inventory for acquisition to others, seek financing for inventory, and so on. In yet another example, the merchant module 310 may provide data analytics for sales, inventory, or other information.

Although the functionality of the merchant module 310 is discussed as being included in a single component, the functionality may be divided into any number of components. In some instances, the functionality is divided into separate applications, which may be linked to each other (e.g., access one application by selecting a link within another application).

The location module 312 may determine a location of the merchant device 300. In some instances, the location is provided to the service provider 102, or used locally, to facilitate various functions, such as determining a location of a merchant, processing of transactions when a customer is located within a particular proximity to the merchant device 300, etc. The location module 312 may determine a geographic location of the merchant device 300 from geo-location techniques (e.g., satellite-based systems—global positioning system (GPS)), cell tower location data, wireless access point location data, wireless beacon location, and so forth. As such, the location module 312 may utilize data from a location sensor of the merchant device 300, such as a GPS receiver or communication interface that can determine (e.g., from cell towers or wireless access points) a geographic location of the merchant device 300.

In some types of businesses, the merchant device 300 may be associated with a store or other place of business of a merchant, and thus, may be a fixed location that typically does not change on a day-to-day basis. In other types of businesses, however, the merchant device 300 may move locations from time to time, such as in the case where the merchant operates a food truck, is a street vendor, a cab driver, etc. or has an otherwise mobile business (e.g., in the case of merchants who sell items at buyer's homes, places of business and so forth).

Figure 4:
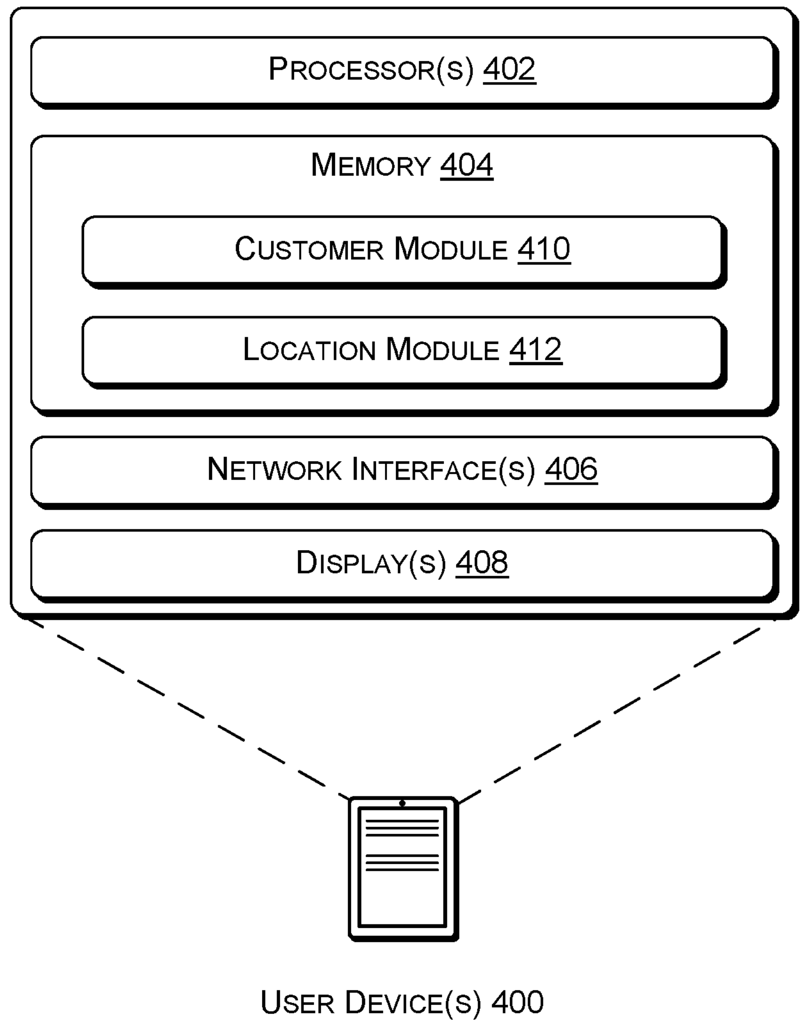
FIG. 4 illustrates example details of a user device.

FIG. 4 illustrates example details of a user device 400. For example, the user device 400 may be employed by the user 104 of FIG. 1. The user device 400 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the merchant device 300 may be a mobile device.

The user device 400 may include one or more processors 402, memory 404, one or more network interfaces 406, and one or more displays 408. The one or more processors 402 may include a central processing unit (CPU), a graphics processing unit (GPU), a microprocessor, a digital signal processor, and so on. The one or more displays 408 may include a touch screen, a Liquid-crystal Display (LCD), a Light-emitting Diode (LED) display, an organic LED display, a plasma display, an electronic paper display, or any other type of technology. Although not illustrated, the user device 400 may also include, or be associated with, other components, such as a camera(s), a microphone(s), a speaker (s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or another sensor. The user device 400 may additionally include, or be associated with, input device(s) such as a keyboard, a mouse, a pen, a voice input device, a touch input device, etc. The memory 404 may include a customer module 410 and a location module 412.

The customer module 410 (and/or the location module 412) may represent a customer-facing component that may generally be used by a customer. Although in some instances a merchant may interact with the customer-facing component (e.g., to confirm payment, provide delivery information, or provide other input). The customer module 410 may perform various processes to assist a customer in facilitating transactions with merchants. In doing so, the customer module 410 may provide various interfaces and/or dashboards. In some instances, the customer module 410 may be referred to as an application, such as an item acquisition application. Further, in some instances the customer module 410 may comprise a local application that operates in cooperation with a service provider associated with a merchant, such as a user application to order pizza from a pizza merchant.

The customer module 410 may communicate with the service provider 102 to use courier services provided by the service provider 102. As one example, a customer may interact with an item acquisition interface (e.g., the item acquisition interface 120) provided by the customer module 410 to place an order with a merchant. If the customer module 410 determines that a delivery may be requested (e.g., automatic determination based on a setting in a user profile or previous purchases, determination based on customer input indicating a desire to have the order delivered, etc.), the customer module 410 may generate a request for a delivery proposal and send the request to the service provider 102 via one or more APIs to request information regarding use of courier service provided by the service provider 102. The information of the request may be provided by the customer, retrieved from a data source (e.g., a user profile, etc.), and so on. Although in many instances the customer module 410 provides the information included in a request for a delivery proposal, in some instances the information may be determined (at least in part) at the service provider 102 (e.g., the service provider 102 may receive an item identifier and lookup an item size/weight, the service provider 102 may identify the customer and look up preferences of the customer, etc.).

After submitting a request for a delivery proposal to the service provider 102, the customer module 410 may receive the delivery proposal from the service provider 102. In some instances, information from the delivery proposal is conveyed to the customer. For example, an item acquisition interface may display a cost of delivery, an estimated delivery time, and/or any other information. In other instances, information from the delivery proposal may not be presented to the customer. For example, the item acquisition interface may not display the cost of delivery as an itemized element, but include the cost of delivery in the total cost of the order. As such, in some instances it may appear to the customer that the delivery is being handled by the merchant. In any event, the customer module 410 may send an indication of acceptance or rejection of the delivery proposal to the service provider 102 via the one or more APIs.

The customer module 410 may also communicate with the service provider 102 via the one or more APIs to request and/or receive information on a status of a transaction. For example, the customer module 410 may receive information regarding a status of preparation of an item (e.g., almost finished, done, entering the oven, bagged and ready for pickup, etc.), a status of delivery by courier services (e.g., a specific location of a courier, how far away a courier is, whether or not an item has been dropped off, courier is in-transit to the pick-up location, etc.), and so on. Such information may be presented to the customer. In one example, a map is displayed to the customer with an icon or other element indicating a location of the courier. Additionally, or alternatively, an advertisement may be displayed. To illustrate, the customer module 410 may display an advertisement for an online site associated with delivering items for merchants. The advertisement may encourage the customer to use the online site to place orders in the future, instead of placing an order with a merchant directly. Although in other illustrations, any type of advertisement may be displayed.

The customer module 410 may additionally, or alternatively, perform other processing. As one example, the customer module 410 may provide information via an interface regarding merchants that are within a predetermined proximity to a user. The user may select a merchant and order an item with the merchant. Additionally, or alternatively, the customer module 410 may enable the user to provide payment for an item (e.g., via a card reader, NFC connection to a merchant device, Bluetooth® connection to a merchant device, etc.), receive receipts for items, and so on. Further, the customer module 410 may enable the user to check-in to a merchant to carry out a card-less payment transaction.

The location module 412 may determine a location of the user device 400. In some instances, the location is provided to the service provider 102, or used locally, to facilitate various functions, such as processing of transactions when a customer is located within a particular proximity to a merchant device. The location module 412 may determine a geographic location of the user device 400 from geolocation techniques (e.g., satellite-based systems—global positioning system (GPS)), cell tower location data, wireless access point location data, wireless beacon location, and so forth. As such, the location module 412 may utilize data from a location sensor of the user device 400, such as a GPS receiver or communication interface that can determine (e.g., from cell towers or wireless access points) a geographic location of the user device 400.

Figure 5:
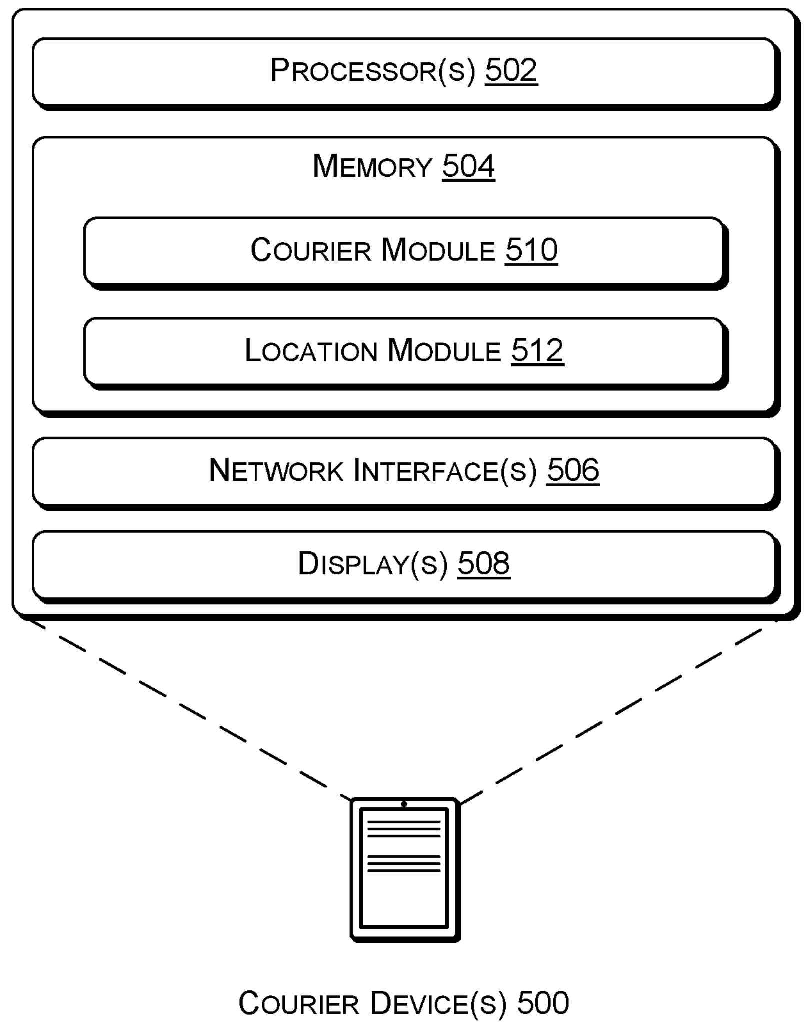
FIG. 5 illustrates example details of a courier device.

FIG. 5 illustrates example details of a courier device 500. For example, the courier device 500 may be employed by the courier 108 of FIG. 1. The courier device 500 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile, an appliance, a camera, a robot, a hologram system, a security system, a home-based computer system (e.g., intercom system, home media system, etc.), a projector, an automated teller machine (ATM), and so on. In some instances, the courier device 500 may be a mobile device.

The courier device 500 may include one or more processors 502, memory 504, one or more network interfaces 506, and one or more displays 508. The one or more processors 502 may include a central processing unit (CPU), a graphics processing unit (GPU), a microprocessor, a digital signal processor, and so on. The one or more displays 508 may include a touch screen, a Liquid-crystal Display (LCD), a Light-emitting Diode (LED) display, an organic LED display, a plasma display, an electronic paper display, or any other type of technology. Although not illustrated, the courier device 500 may also include, or be associated with, other components, such as a camera(s), a microphone(s), a speaker (s), a projector(s), a printer(s), and/or a sensor(s). The one or more cameras may include a front facing camera and/or a rear facing camera. The one or more sensors may include an accelerometer, compass, gyroscope, magnetometer, Global Positioning System (GPS), olfactory sensor (e.g., for smell), or another sensor. The courier device 500 may additionally include, or be associated with, input device(s) such as a keyboard, a mouse, a pen, a voice input device, a touch input device, etc. The memory 504 may include a courier module 510 and a location module 512.

The memory 504 (as well as the memory 204 of the service provider 102, the memory 304 of the merchant device 300, the memory 404 of the user device 400, and/or all other memory described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

The courier module 510 (e.g., courier application) may receive order information from the service provider 102 to provide a courier with information for picking up a particular order from a merchant's pick-up location and/or for delivering the order to a buyer's delivery location. The courier module 510 may further enable the courier to respond to the service provider 102 to confirm acceptance or rejection of a delivery job. In some cases, the courier module 510 may facilitate the courier to become active or inactive (e.g., in cases where users are used as couriers). For example, the courier module 510 may be periodically pinged by the service provider 102 to determine interest in becoming active and, if so, requesting current location information of the associated courier. A courier who is interested in being activated may respond with location information, while a courier who is not interested in being activated may keep location information private by not responding.

The location module 512 may determine a location of the courier device 500. In some instances, the location is provided to the service provider 102, or used locally, to facilitate various functions. The location module 512 may determine a geographic location of the courier device 500 from geolocation techniques (e.g., satellite-based systems—global positioning system (GPS)), cell tower location data, wireless access point location data, wireless beacon location, and so forth. As such, the location module 512 may utilize data from a location sensor of the courier device 500, such as a GPS receiver or communication interface that can determine (e.g., from cell towers or wireless access points) a geographic location of the courier device 500.

FIG. 6 illustrates an example sequence diagram 600 of the techniques in the context of initiating an order at a user device. The example sequence diagram 600 illustrates various operations that are performed in an example order by the user device 400, the merchant device 300, the service provider 102, and/or the courier device 500. Such operations are illustrated as an example and may be performed in other orders, at other times, and/or by other devices. In some instances, operations that are described as being performed by the merchant device 300 and/or the user device 400 may be performed (at least in part) by another service provider, such as the service provider 116.

At 602, the user device 400 may receive buyer input from a user regarding interest in an item. For example, the user may interact with an item acquisition interface to place an item in an electronic shopping cart for purchase. The user may indicate an interest in having the item delivered.

At 604, the user device 400 may generate and/or send a delivery proposal request to the service provider 102. The delivery proposal request may be sent via one or more APIs associated with the service provider 102. In some instances, the user may specify the information included in the delivery proposal request, while in other instances information may otherwise be specified or determined.

At 606, the courier device 500 may determine a location of the courier device 500 and/or send location information indicating the location of the courier device 500 to the service provider 102. Such location information may be sent at any time. For example, the location information may be sent as a location changes, periodically, and/or at other times. As such, multiple pieces of location information may be sent over time.

At 608, the service provider 102 may generate a delivery proposal. The delivery proposal may be based on various information as discussed herein, such as information included in the delivery proposal request, information about a courier, information about a merchant, information about a user, and so on. At 610, the service provider 102 may send the delivery proposal to the user device 400.

In the example sequence diagram 600, the user may accept the delivery proposal at 612 and send a delivery proposal acceptance to the service provider 102 via the one or more APIs associated with the service provider 102 at 614. In some instances, one or more criteria may be established for acceptance/rejection of a delivery proposal, so that the delivery proposal is automatically accepted/rejected upon satisfying the one or more criteria.

Upon receiving the delivery proposal acceptance, the service provider 102 may send an order request to the merchant device 300 at 616. The order request may request if the merchant is able to fulfill the order that is placed by the user. In some instances, the order request may include any information in the delivery proposal. Although illustrated as being performed by the service provider 102, in some instances the order request may be sent from a service provider associated with the merchant, such as a service provider that facilities an online site for purchases with the merchant. In the example sequence diagram 600, the merchant device 300 sends an order acceptance at 620 indicating that the merchant is able to fulfill the order that is placed by the user.

At 622, the service provider 102 may select a courier to deliver the item to the buyer. The courier selection may be based on various information, such as information included in a request for a delivery proposal, information in a delivery proposal, information about a courier (e.g., location information, courier profile information, etc.), information about a merchant (e.g., location information, merchant profile information, etc.), information about a buyer (e.g., location information, a user profile, etc.), and so on.

At 624, the service provider 102 may communicate with the courier device 500 to request that the courier device 500 delivery the item to the user. The service provider 102 may communicate with any number of courier devices until a courier device sends an acceptance indicating that the courier device is available to deliver the item.

At 626, the service provider 102 may send a delivery acceptance to the merchant device 300 indicating that the courier device 500 has accepted delivery. In some instances, the delivery acceptance may indicate a current status of the courier, such as a current location of the courier, etc. Further, in some instances the delivery acceptance may include any information in the delivery proposal.

At 628, the merchant device 300 may present information to the merchant regarding the order. For example, the merchant device 300 may display a status of progress of preparing the item by the merchant, information included in the delivery proposal, information included in the delivery acceptance, and so on.

At 630, the courier device 500 may determine and/or send location information indicating a location of the courier device 500. In some instances, the courier device 500 may send other information, such as a confirmation that an item has been picked-up at the merchant's location. Such location information and/or other information may be sent at any time.

At 632, the service provider 102 may send a delivery update to the merchant device 300 (e.g., a status of delivery of the item). The delivery update may be based on information received by the courier device 500 at 630. The delivery update may indicate a status of delivery of item, such as a location of the courier device 500, an indication of the item being picked-up or dropped-off, etc. At 634, the service provider 102 may also provide the delivery update to the user device 400. At 636, the merchant device 300 may present information in the delivery update to the merchant. At 638, the user device 400 may present the information in the delivery update to the user.

Figure 7:
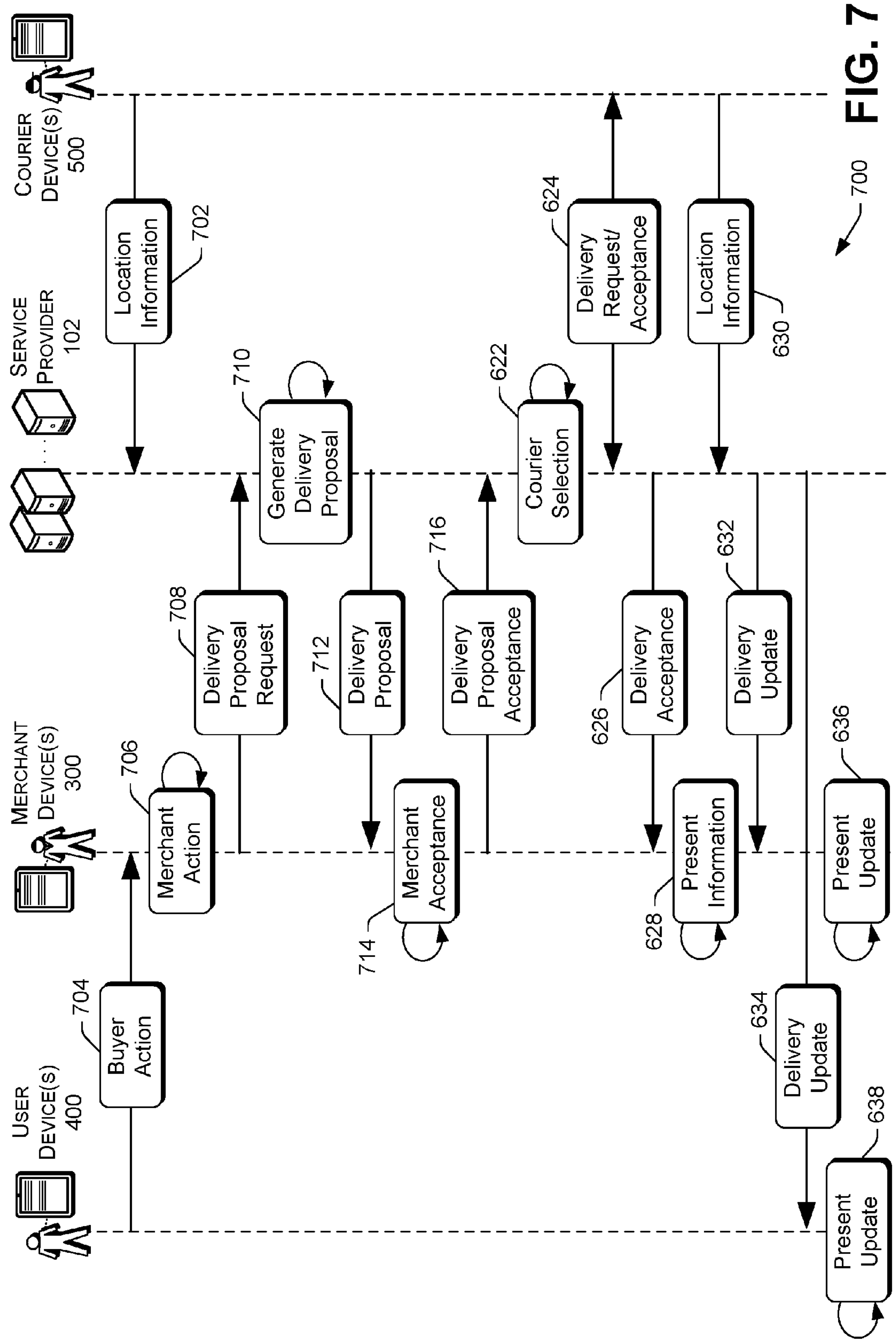
FIG. 7 an example sequence diagram of the techniques in the context of initiating an order at a merchant device.

FIG. 7 an example sequence diagram 700 of the techniques in the context of initiating an order at a merchant device. The example sequence diagram 700 illustrates various operations that are performed in an example order by the user device 400, the merchant device 300, the service provider 102, and/or the courier device 500. Such operations are illustrated as an example and may be performed in other orders, at other times, and/or by other devices. In some instances, operations that are described as being performed by the merchant device 300 and/or the user device 400 may be performed (at least in part) by another service provider, such as the service provider 116.

At 702, the courier device 500 may determine a location of the courier device 500 and/or send location information indicating the location to the service provider 102. Such location information may be sent at any time. For example, the location information may be sent as a location changes, periodically, and/or at other times. As such, multiple pieces of location information may be sent over time.

At 704, the user may perform an action and the user device 400 may send information regarding the action to the merchant device 300. For example, the user may enter an establishment of a merchant, place a telephone call with the merchant, send a notification to the merchant (e.g., email, text message, etc.), or otherwise communicate with the merchant to cause the merchant to place an order. Although the user device 400 is illustrated as sending a communication to the merchant device 300, in some instance such communication may merely include the user speaking to the merchant, such as in the case when the user is talking on the telephone, in-person at the merchant's establishment, and so on.

At 706, the merchant may perform an action on the merchant device 300. For example, the merchant may place an order for the user based on an action performed by the user at 704. To illustrate, the merchant may interact with an item acquisition interface to place an item in an electronic shopping cart for purchase based on a communication from the user indicating an interest purchasing the item.

At 708, the merchant device 300 may generate and/or send a delivery proposal request to the service provider 102. The delivery proposal request may be sent via one or more APIs associated with the service provider 102. In some instances, the user may specify the information included in the delivery proposal request, while in other instances the merchant or merchant device 300 may identify the information.

At 710, the service provider 102 may generate a delivery proposal. The delivery proposal may be based on various information as discussed herein, such as information included in the delivery proposal request, information about a courier, information about a merchant, information about a user, and so on. At 712, the service provider 102 may send the delivery proposal to the merchant device 300.

In the example sequence diagram 700, the merchant may accept the delivery proposal at 714. In some instances, one or more criteria may be established for acceptance/rejection of a delivery proposal, so that the delivery proposal is automatically accepted/rejected upon satisfying the one or more criteria. Further, in some instances the merchant may communicate the delivery proposal to the user (e.g., orally, though a notification, etc.) and the user may indicate acceptance of the delivery proposal. At 716, the merchant device 300 may send a delivery proposal acceptance to the service provider 102 via the one or more APIs provided by the service provider 102.

Upon receipt of the delivery proposal acceptance at the service provider 102, the operations of the example sequence diagram 700 may proceed in a manner similar to the example sequence diagram 600 of FIG. 6. That is, the operations 622-638 of FIG. 6 may be performed by various devices in the example sequence diagram 700, as shown in FIG. 7.

Figure 8:
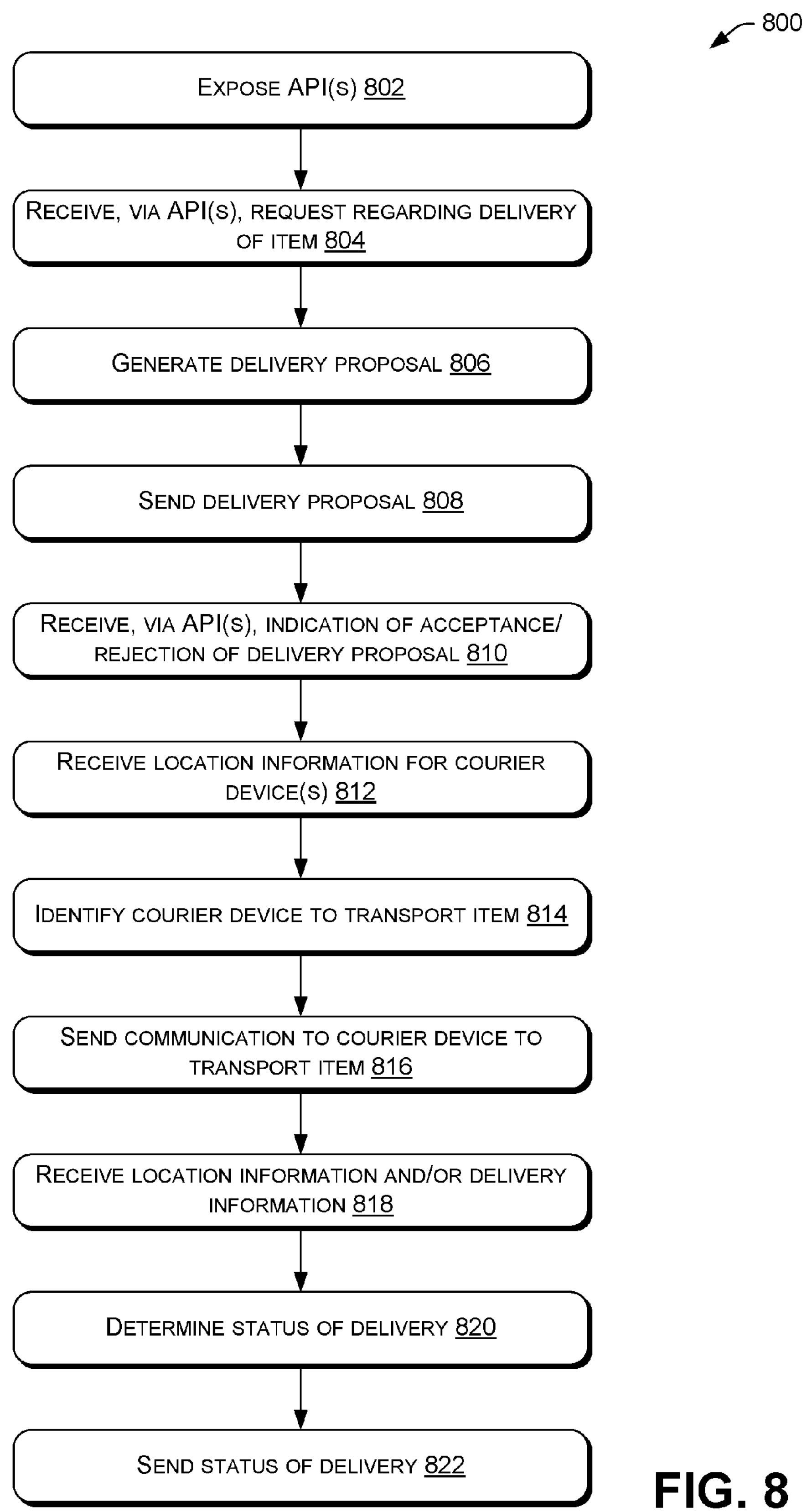
FIG. 8 illustrates an example process to expose one or more APIs to enable entities to use courier services provided by a service provider.
Figure 9:
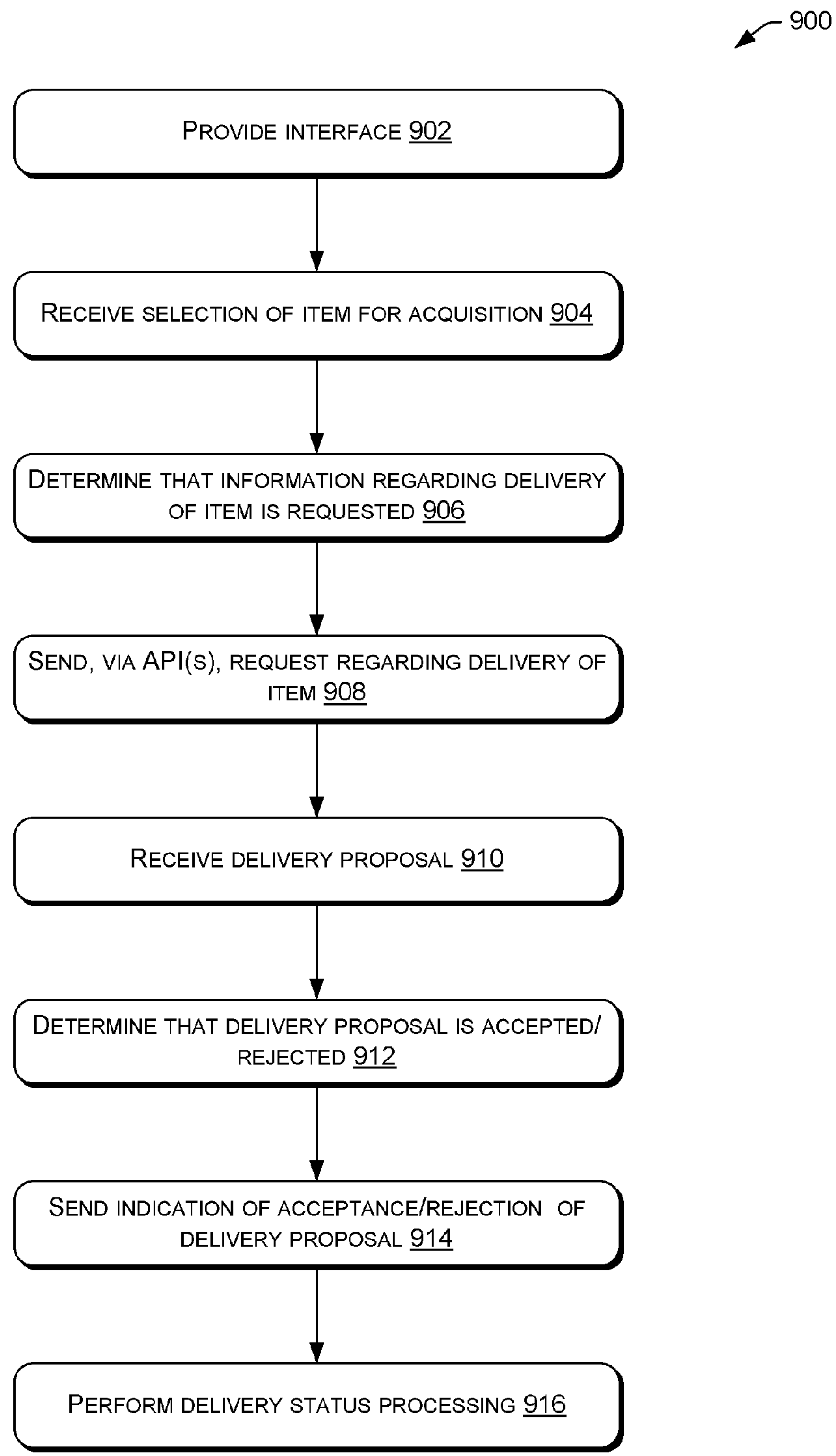
FIG. 9 illustrates an example process to communicate with a service provider via one or more APIs to use courier services provided by the service provider.
Figure 10:
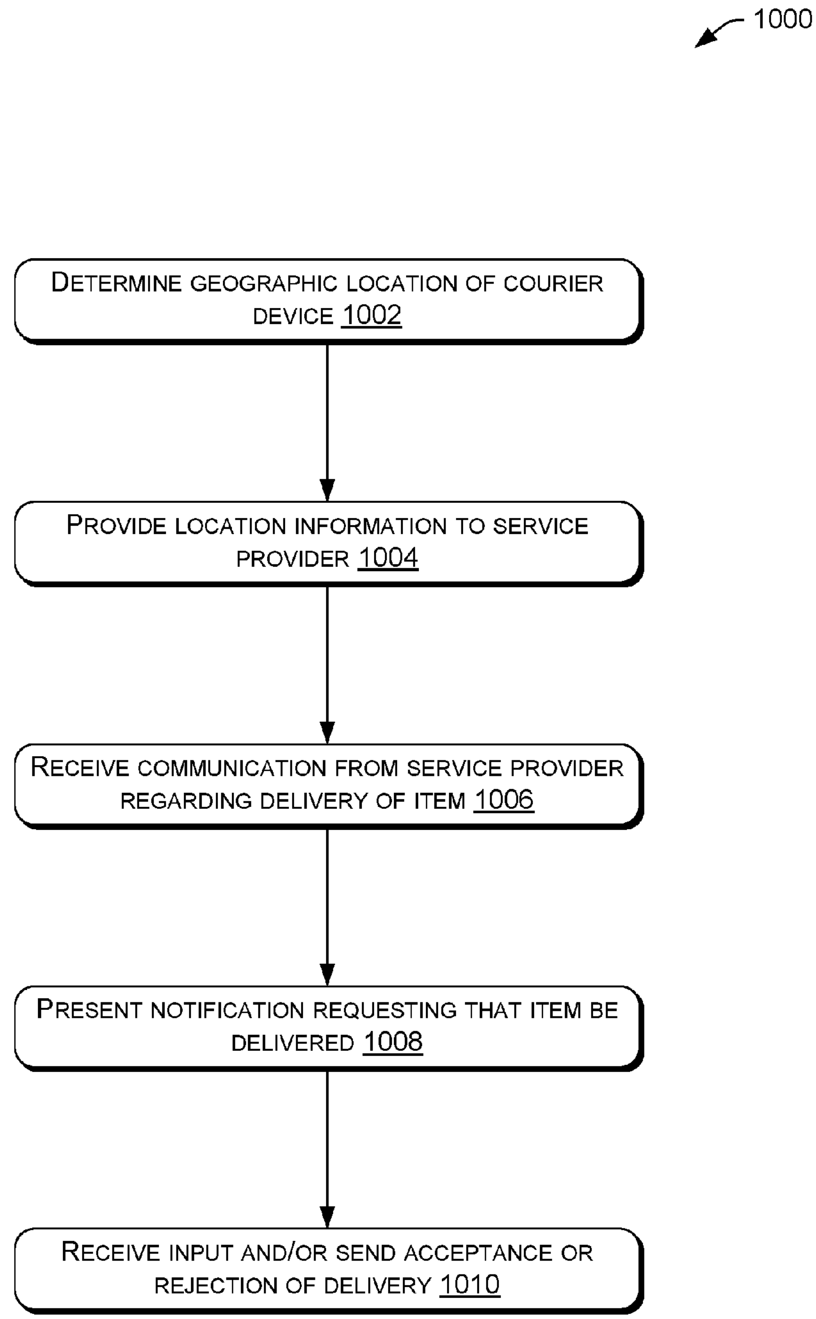
FIG. 10 illustrates an example process to notify a courier regarding a delivery of an item.

FIGS. 8-10 illustrate example processes 800, 900, and 1000 for employing the techniques described herein. For ease of illustration the processes 800, 900, and 1000 may be described as being performed by a computing device described herein, such as the service provider 102, the merchant device 300, the user device 400, and/or the courier device 500. However, the processes 800, 900, and 1000 may be performed by other devices. Moreover, the devices may be used to perform other processes.

The processes 800, 900, and 1000 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted. In some examples, operations that are described in the processes 800, 900, and/or 1000 as being performed by a device or service provider may be performed by an application running on the device or service provider.

FIG. 8 illustrates the example process 800 to expose one or more APIs to enable entities to use courier services provided by the service provider 102.

At 802, the service provider 102 may expose one or more APIs to provide a computing device with access to delivery resources of a courier service that is associated with the service provider 102. For example, the service provider 102 may expose the one or more APIs to a computing device associated with a merchant and/or a customer to facilitate delivery of items offered by the merchant.

At 804, the service provider 102 may receive, via the one or more APIs, a request regarding delivery of an item. The request may be received from a computing device associated with a merchant or a customer. The request may indicate a location of delivery, a location of pick-up, a requested time of pick-up, a number of items being acquired, a size of the item, whether or not the item is associated with a predetermined category, a weight of the item, and so on. In some instances, the request is received from an application that is executable on a computing device associated with a merchant or a customer. The request may be for delivery of any type of item. In one example, the item may be a computing device (e.g., tablet, etc.) that is configured with a merchant application that facilitates acquisition of items with customer (e.g., a proprietary merchant application that may not be available to the general public). Here, the request may seek to deliver the item to a merchant to onboard the merchant (e.g., register) the merchant with a service provider to use purchasing resources provided by the service provider. The purchasing resources may be used as the merchant interacts with the delivered computing device. In other examples, the item may be other types of items.

At 806, the service provider 102 may generate a delivery proposal regarding delivery of an item. The delivery proposal may include a cost for delivery of the item by the courier service associated with the service provider 102, an estimated amount of time for delivery of the item by the courier service, an estimated pick-up time for delivery of the item, an estimated drop-off time for delivery of the item, and so on. In some instances, the service provider 102 may determine the cost for delivery of the item (or any other information in the delivery proposal) based on a current location of a courier, a location of pick-up of the item, a location of drop-off of the item, an estimated preparation time of the item by a merchant associated with the item, and so on.

At 808, the service provider 102 may send a delivery proposal to a computing device, such as a computing device associated with a merchant or a user.

At 810, the service provider 102 may receive, via the one or more APIs, an indication of acceptance or rejection of a delivery proposal. The indication of acceptance or rejection may be received from a computing device associated with a merchant or a user.

At 812, the service provider 102 may receive location information for courier devices. The location information may be received at any time, through a different API than that used to communicate with a merchant or customer, through a non-API channel, and so on. The location information may identify a current location of a courier device.

At 814, the service provider 102 may identify a courier device to transport the item. In many instances, such identification may be performed in response to receiving an indication of acceptance of a delivery proposal. The courier device may be identified based on a variety of information, such as a location of the courier device identified in the location information.

At 816, the service provider 102 may send a communication to a courier device to transport an item. The communication may request that the associated courier obtain the item from a location of pick-up and transport the item to a location of delivery. The communication may include various information about the delivery, such as information in a request for a delivery proposal, information in the delivery proposal, and so on. The communication may be sent through a different API than that used to communicate with a merchant or customer, through a non-API channel, and so on. In some instances, the service provider 102 may receive an indication of acceptance from the courier device indication that the courier will deliver the item.

At 818, the service provider 102 may receive location information and/or delivery information. The location information and/or delivery information may be received from a courier device and/or a merchant device. In many instances, such information may be received after delivery has begun. The location information may generally indicate a location of the courier. The delivery information may include, for example, input from a courier indicating a location of the courier, information from the courier or merchant indicating that an item has been picked-up, and so on.

At 820, the service provider 102 may determine a status of delivery of an item being delivered. The status of delivery may be based on the location information and/or delivery information received at 822.

At 822, the service provider 102 may send a status of delivery to a computing device associated with a merchant or a customer. The computing device may display the status of delivery to the merchant or the customer.

In some instances, the service provider 102 may receive orders through multiple channels. If an order is received though a non-merchant channel (e.g., directly from a customer), the service provider 102 may communicate with the merchant to request that the merchant fulfill the order. If accepted by the merchant, the merchant may send an indication of acceptance and the service provider 102 may proceed with facilitating delivery by a courier. Further, a status of delivery may be determined for any number of deliveries that are in progress. In some instances, multiple statuses for multiple items with a single merchant or customer may be determined and sent to a merchant device or customer device.

FIG. 9 illustrates the example process 900 to communicate with the service provider 102 via one or more APIs to use courier services provided by the service provider 102. The process 900 is discussed in the context of being performed by an item acquisition device, such as a computing device associated with a merchant or a customer.

At 902, the item acquisition device may provide an interface, such as the item acquisition interface 120 of FIG. 1. This may include displaying the item acquisition interface via a display. The interface may enable a user to place an order for an item.

At 904, the item acquisition device may receive a selection of an item for acquisition. For example, a user (e.g., merchant, customer, etc.) may place an item in an electronic shopping cart to indicate an intention of purchasing the item from a merchant. In some instances, the user may also provide other information, such as a location of delivery, a location of pick-up, a requested time of pick-up, a number of items being acquired, a size of the item, whether or not the item is associated with the predetermined category, a weight of the item, and so on. In other instances, such information may be determined automatically.

At 906, the item acquisition device may determine that information regarding delivery of an item is requested. This may include receiving input from a user indicating an interest in having the item delivered, identifying a distance between a location of a customer and a location of a merchant (e.g., if the distance is greater than a threshold, determine that delivery is being requested), and so on. In some instances, it may automatically be determined that delivery information is being requested for each order.

At 908, the item acquisition device may send, via one or more APIs associated with the service provider 102 and to the service provider 102, a request regarding delivery of an item. Such request may request a delivery proposal. In some instances, the request may indicate a location of delivery, a location of pick-up, a requested time of pick-up, a number of items being acquired, a size of the item, whether or not the item is associated with a predetermined category, a weight of the item, and so on.

At 910, the item acquisition device may receive a delivery proposal from the service provider 102. The delivery proposal may indicate a cost for delivery of the item by a courier service associated with the service provider 102, an estimated amount of time for delivery of the item, an estimated pick-up time for delivery of the item, an estimated drop-off time for delivery of the item, and so on.

At 912, the item acquisition device may determine that a delivery proposal is accepted or rejected. In some instances, the item acquisition device may display information included within the delivery proposal (e.g., a cost for delivery of an item, an estimated amount of time for delivery of the item, etc.) and receive user input regarding acceptance of the delivery proposal. In other instances, the item acquisition device may automatically determine to accept or reject the delivery proposal when one or more criteria are satisfied. As such, the item acquisition device may refrain from displaying information of the delivery proposal, in some instances.

At 914, the item acquisition device may send an indication of acceptance or rejection of a delivery proposal to the service provider 102 via one or more APIs associated with the service provider 102. This may cause the service provider 102 to facilitate delivery of an item. In some instances, the customer may be charged for the delivery, while in other instances the merchant or others may be charged.

At 916, the item acquisition device may perform delivery status processing. For example, the item acquisition device may send, via one or more APIs associated with the service provider 102, a request for a delivery status of an item. Thereafter, the item acquisition device may receive, from the service computing device 102, a status of delivery of the item and display the status of delivery. In other examples, a status of delivery may be determined at a merchant device (e.g., based on knowing that a courier picked-up an item), and the status of delivery may be sent to a customer device.

FIG. 10 illustrates the example process 1000 to notify a courier regarding a delivery of an item.

At 1002, the courier device 500 may determine a geographic location of the courier device 500. The geographic location may be determined based on data from a location sensor of the courier device 500, such as a satellite-based sensor (e.g., Global Position System (GPS), cell tower radio, wireless access point radio, wireless beacon location sensor, and so forth).

At 1004, the courier device 500 may provide location information to a service computing device 102. The location information may indicate the geographic location of the courier device 500. The location information may be provided periodically, at a particular time, upon request, and so on.

At 1006, the courier device 500 may receive a communication from the service provider 102 regarding delivery of an item. For example, the communication may include a request for a courier associated with the courier device 500 to obtain an item from a merchant and transport the item to a customer. The request may specify a time frame for the delivery (e.g., a delivery time), a number of items to delivery, a route of delivery, a location(s) of a merchant, or any other information that may be useful in making the delivery.

At 1008, the courier device 500 may present a notification requesting that an item be delivered (e.g., obtained from an establishment of a merchant and transported to a location of delivery). The notification may be presented via a display, a speaker, and so on. In some instances, the information is displayed via a courier interface that facilitates deliveries of items (e.g., an interface that enables the courier to accept deliveries, acknowledge that deliveries have been made, request additional deliveries, etc.). The courier device 500 may present any information that is included in the communication that is received at 1006.

At 1010, the courier device 500 may receive input from the courier and/or send acceptance or rejection regarding delivery of an item. For example, if the input indicates that the courier accepts a task of delivering items to a customer, the courier device 500 may send a communication to the service provider 102 indicating that such task has been accepted.

FIG. 11 illustrates an example process 1100 of communicating via one or more APIs exposed by a service provider to use courier services provided by the service provider and track delivery of an order. In FIG. 11, elements that are illustrated on the bottom portion of FIG. 11 (below a line established by one or more service provider APIs 1102) may represent operations performed by a service provider, such as the service provider 102.

In the example process 1100, a user interacts with a user interface 1104(*a*) to place items 1106 in an electronic shopping chart for purchase. In particular, the user interface 1104(*a*) may allow the user to browse for items sold by a merchant (Company A) and place items in the electronic shopping cart to submit an order. Details for the items 1106 may be provided via the user interface 1104(*a*) once the items 1106 are selected. As illustrated, the user interface 1104 is associated with "Company A," a pizza restaurant in this example. The user interface 1104 may be implemented through a web site, an application (e.g., mobile application), and so on.

When the user decides to checkout, the user may select a button 1108 and navigate to a user interface 1104(*b*) to initiate the checkout process. Through the user interface 1104(*b*), the user may provide information through input fields 1110 to facilitate purchase of the order. In this example, the input fields 1110 accept address information for delivery of the item (or otherwise for the purchase) and a credit card number. Although any information that may be provided via the input fields 1110, such as any type of information that is included in a request for a delivery proposal. In any event, the user may provide the information and proceed to the next step of checkout by selecting a button 1112. Selection of the button 1112 may cause order details 1114 to be sent to the service provider via the one or more service provider APIs 1102. In some instances, the order details 1114 may be referred to as (and/or include any information of) a request for a delivery proposal.

A box 1116 may represent information that is transmitted through the one or more service provider APIs 1102 to generate a delivery proposal. At 1118, the service provider may perform a validation operation to check that the order details are sufficient to move forward with delivering the order (e.g., more than a threshold amount of information is provided and/or specific information is provided). At 1120, the service provider may determine a price of delivery of the order for using the courier services associated with the service provider. In this example, the price of delivery is $8.50. At 1122, the service provider may estimate a time of pickup of the order from the merchant and/or an amount of delivery time for the order. In this example, the estimated pickup time is in 20 minutes and the estimated delivery time is 45-60 minutes. At 1124, the service provider may generate a delivery proposal. The delivery proposal may include the price for delivery, the estimated time of pickup, the amount of delivery time, and/or any other information that is described herein in reference to a delivery proposal. The details of the delivery proposal may be sent to the computing device implementing the user interface 1104, as illustrated at 1126.

The user interface 1104(*c*) may display the details of the delivery proposal as well any other information regarding the order. As illustrated, information 1128 may include the estimated amount of delivery time, a price for purchasing the items from the merchant (Company A), and a price for the delivery. To place the order (e.g., indicate acceptance) and finish the checkout process, the user may select a button 1130. Upon selecting the button 1130, the merchant (Company A) may generate an order within their system and/or charge the customer. Further, upon selecting the button 1130, an acceptance 1132 (also referred to as an indication of acceptance) may be sent to the service provider via the one or more service provider APIs 1102 to proceed with delivery.

A box 1134 may represent information that is transmitted through the one or more service provider APIs 1102 to cause fulfillment of the order and provide details regarding the fulfillment. As illustrated, at 1136, the service provider may charge the merchant (Company A) for using the courier services of the service provider. Here, the merchant is charged $8.50 for the delivery. The merchant may forward the charge onto the customer (e.g., require the customer to pay for the delivery). At 1138, the service provider may cause the order to be fulfilled by a courier. This may include placing the order into a logistics stack for the courier services to fulfill the order. At 1140, the service provider may generate (or determine) details regarding fulfillment of the order, such as a courier that has been selected, a location of the courier, and so on. The service provider may send a confirmation of delivery 1142 to the computing device implementing the user interface 1104 via the one or more service provider APIs 1102. The confirmation of delivery 1142 may include the details generated (or determined) at 1140.

The user interface 1104(*d*) may display information included in the confirmation of delivery 1142, as well as other information related to placement of the order. The user interface 1104(*d*) may represent a combined interface for the merchant (Company A) and the courier services of the service provider. In this example, the user interface 1104(*d*) displays an estimated amount of delivery time (45-60 minutes) and a map 1144 indicating a status of delivery of a courier 1146 that is assigned to deliver the order. As illustrated, the map 1144 indicates locations for pickup and delivery of the order 1148 (e.g., the merchant's location and the customer's location) and a location of the courier 1146. The map 1144 also illustrates a route the courier 1146 will take to deliver the order. As such, the user may track progress of the order.

The information shown on the map 1144 may be provided by the service provider via the one or more service provider APIs 1102, as illustrated by a box 1150. In particular, a request for the information may be sent to the service provider. In response to receiving the request, the service provider may, at 1152, obtain a fulfillment status and a location of a courier. At 1154, the service provider may generate details regarding a status of delivery of the order, and send those details to the computing device implementing the user interface 1104(*d*). The details may be displayed via the map 114 as the locations for pickup and delivery of the order 1148, the location of the courier 1146, a route of the courier 1146, and so on.

As also illustrated in FIG. 11, the user interface 1104(*d*) may display an advertisement 1156. The advertisement 1156 may include various information. To illustrate, the advertisement 1156 may include information to download an application provided by the service provider or the courier service. This application may allow users to interact directly with the service provider or courier service to utilize delivery services provided by the courier service (e.g., to order items directly through the service provider or courier service). In other illustrations, other types of advertisements or content is displayed.

Figure 12:
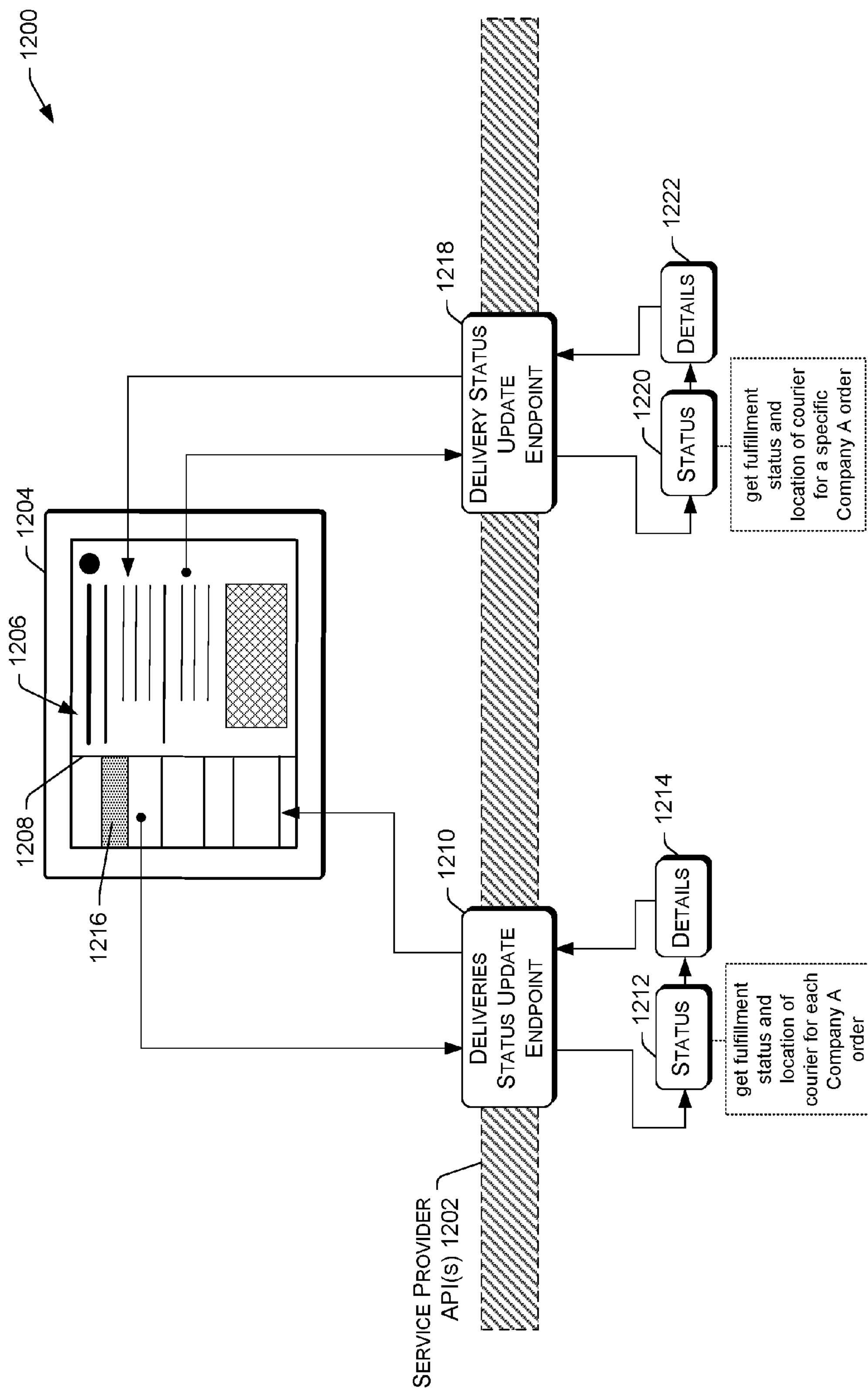
FIG. 12 illustrates an example process of communicating via one or more APIs exposed by a service provider to provide status updates regarding orders.

FIG. 12 illustrates an example process 1200 of communicating via one or more APIs exposed by a service provider to provide status updates regarding orders. In FIG. 12, elements that are illustrated on the bottom portion of FIG. 12 (below a line established by one or more service provider APIs 1202) may represent operations performed by a service provider, such as the service provider 102.

In the example of FIG. 12, a computing device 1204 associated with a merchant implements a user interface 1206 to provide status information regarding orders that have been placed with the merchant. A left side of the user interface 1206 may display relatively high level information of all orders (or a particular number of orders) that have been placed with the merchant, regardless of a channel from which the orders are placed (e.g., telephone, customer application, web site, etc.). Meanwhile, a right side of the user interface may display more detailed information for one or more selected orders. The left and right sides of the user interface 1206 are separated by a line 1208.

As illustrated, status information regarding a delivery of an item may be obtained by communicating with the service provider via the one or more service provider APIs 1202. For example, status information for orders that are listed on the left side of the user interface 1206 may be obtained by requesting the information from the service provider, as illustrated at 1210. At 1212, the service provider may determine statuses of the orders by obtaining fulfillment information and determining locations of couriers assigned to each of the orders for the merchant (Company A). At 1214, the service provider may generate the details regarding the statuses and send the details to the computing device 1204 for display via the left side of the user interface 1206.

If the merchant selects a particular order on the left side of the user interface 1206, such as order 1216, more detailed information that is specific to that order may be displayed on the right side of the user interface 1206. In particular, the computing device 1204 may request additional status information regarding the selected order 1216, as illustrated at 1218. At 1220, the service provider may determine a status of the selected order by obtaining fulfillment information and determining a location of a courier assigned to the selected order. At 1222, the service provider may generate the details regarding the status and send the details to the computing device 1204 for display via the right side of the user interface 1206. In some instances, the details displayed on the right side may be more specific than those displayed on the left side. As such, the merchant many view status information of orders placed through various types of channels.

In some instances, the box 1210 represents an API for obtaining status information for all orders (or a particular number of orders) of a merchant that are currently being delivered by the courier services of the service provider. Meanwhile, the box 1218 may represent an API for obtaining status information for a specific order of a merchant that is currently being delivered by the courier services of the service provider.

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A system comprising:

a service computing device including a service computing device processor and a service computing device communication interface communicatively coupled to the service computing device processor, the service computing device communication interface for communicating over one or more networks with a plurality of courier devices, and further for communicating over the one or more networks via one or more Application Programming Interfaces (APIs) with a merchant application executable on a merchant computing device associated with a merchant, wherein the one or more APIs are exposed by the service computing device and integrated into the merchant application, the service computing device being configured to:

receive, from the merchant application on the merchant computing device, via the one or more APIs, a request regarding delivery of an item that is specified by a customer to be acquired from the merchant, the request indicating at least one of a location of delivery, a location of pick-up, a requested time of pick-up, a number of items being acquired, a size of the item, whether or not the item is associated with a predetermined category, or a weight of the item, the request being received via the one or more APIs from the merchant application on the merchant computing device;

generate a delivery proposal for delivering the item to the location of delivery, the delivery proposal including a cost for delivery of the item by a courier service associated with the service computing device and an estimated timing for delivery of the item by the courier service;

send the delivery proposal to the merchant application on the merchant computing device;

receive, via the one or more APIs, from the merchant application on the merchant computing device, an indication of acceptance of the delivery proposal;

receive location information for individual ones of the plurality of courier devices;

identify a courier associated with a first courier device of the plurality of courier devices to transport the item based at least in part on the indication of acceptance of the delivery proposal and the location information for the individual ones of the plurality of courier devices; and send, without using the one or more APIs, a communication to a courier application executable on the first courier device requesting that the identified courier obtain the item from the location of pick-up and transport the item to the location of delivery;

wherein the courier application is executable by one or more processors of the first courier device to:

determine a geographic location of the first courier device based at least in part on data from a location sensor of the first courier device;

provide location information to the service computing device indicating the geographic location of the first courier device; and based at least in part on the communication from the service computing device, present a notification to the identified courier via the first courier device requesting that the item be obtained from the location of pick-up and transported to the location of delivery;

wherein the service computing device is further configured to:

receive, from the merchant application on the merchant computing device, via the one or more APIs integrated into the merchant application, a request for a delivery status of the item, wherein the request is received based on an input via a first user interface presented by the merchant application on the merchant computing device;

receive further location information for the first courier device;

determine a delivery status of the item based at least partially on the received further location information; and send, to the merchant application, the delivery status of the item, wherein the merchant application displays, in the first user interface, the delivery status of the item.

2. The system of claim 1, wherein the merchant application is further executable to configure the merchant computing device to:

provide a second interface for presentation to at least one of the customer or the merchant on a display associated with the merchant computing device;

receive, via the second interface, a selection of the item for acquisition and information regarding at least one of the location of delivery, the location of pick-up, the requested time of pick-up, the number of items being acquired, the size of the item, whether or not the item is associated with the predetermined category, or the weight of the item;

receive, via the second user interface a request for information regarding delivery of the item;

send, via the one or more APIs and to the service computing device, the request for information regarding delivery of the item;

receive the delivery proposal from the service computing device;

determine that the delivery proposal is accepted; and send, via the one or more APIs, the indication of acceptance of the delivery proposal to facilitate delivery of the item.

3. The system of claim 2, wherein the merchant application is further executable to configure the merchant computing device to:

display at least one of the cost for delivery of the item or the estimated timing for delivery of the item via the second user interface;

receive, via the second user interface, an input regarding acceptance of the delivery proposal; and send, via the one or more APIs, an indication that the delivery proposal is accepted based at least in part on the received input regarding acceptance of the delivery proposal.

4. The system of claim 2, wherein the merchant application is further executable to configure the merchant computing device to:

refrain from displaying the cost for delivery of the item or refrain from including the cost for delivery of the item as part of a total cost for acquiring the item;

compare the delivery proposal to a plurality of criteria for accepting the delivery proposal, the criteria including a merchant criterion for determining that the cost for delivery is below a cost threshold, and a second criterion for determining that the estimated timing for delivery is within a timing threshold; and send, automatically, via the one or more APIs, an indication of acceptance of the delivery proposal based on determining that the criteria are met.

5. The system of claim 1, wherein the merchant application further configures the merchant computing device to:

present the delivery status of the item in a first portion of the first user interface with a delivery status of one or more other items for one or more other delivery jobs;

receive, via the first user interface, a selection of the delivery status of the item in the first portion of the first user interface;

send, via the one or more APIs integrated into the merchant application, a request for details of the selected delivery status of the item; and receive, from the service computing device, additional details regarding the delivery status of the item.

6. The system of claim 1, wherein the service computing device is further configured to:

receive, via the one or more APIs, an order from a customer application executable on a customer computing device associated with another customer;

send a request to fulfill the order to the merchant application on the merchant computing device to fulfill the order;

receive, from the merchant computing device, via the one or more APIs, an indication of acceptance of the order from the merchant application on the merchant computing device;

determine another courier to deliver the order to a location associated with the other customer;

send a communication to a second courier device that is associated with the other identified courier requesting that the other identified courier obtain the order from the location of pick-up of the merchant and transport the order to the location associated with the other customer;

determine a first delivery status of the item by the identified courier and a second delivery status of the order by the other courier; and send the first delivery status and the second delivery status to the merchant application on the merchant computing device, wherein the merchant application configures the merchant computing device to present the first delivery status and the second delivery status in a first portion of the first user interface, wherein selection of one of the first delivery status or the second delivery status in the first portion of the first user interface causes the first user interface to present details of the selected first or second delivery status in a second portion of the first user interface.

7. The system of claim 1, wherein the delivery proposal further indicates at least one of an estimated pick-up time for delivery of the item or an estimated drop-off time for delivery of the item.

8. A method comprising:

exposing, by a service computing device, to a merchant computing device, one or more Application Programming Interfaces (APIs) for accessing a courier service, wherein the one or more APIs are integrated into a merchant application executable on the merchant computing device;

receiving, by the service computing device, from the merchant application on the merchant computing device, and via the one or more APIs, a request regarding delivery of an item that is specified by a customer to be acquired from the merchant, the request indicating at least one of a location of delivery, a location of pick-up, a requested time of pick-up, a number of items being acquired, a size of the item, whether or not the item is associated with a predetermined category, or a weight of the item;

generating, by the service computing device, a delivery proposal for delivering the item to the location of delivery, the delivery proposal including a cost for delivery of the item by a courier service associated with the service computing service;

sending, by the service computing device, the delivery proposal to the merchant application;

receiving, by the service computing device, from the merchant application on the merchant computing device, and via the one or more APIs, an indication of acceptance of the delivery proposal;

receiving, by the service computing device, location information for individual ones of a plurality of courier devices;

determining a geographic location of a first courier device of the plurality of courier devices based at least in part on data from a location sensor of the first courier device;

identifying, by the service computing device and without using the one or more APIs, a courier associated with the first courier device to transport the item based at least in part on the indication of acceptance of the delivery proposal and the location information for individual ones of the plurality of courier devices;

sending, by the service computing device, a communication to the first courier device that is associated with the identified courier requesting that the identified courier obtain the item from the location of pick-up and transport the item to the location of delivery;

presenting a notification to the identified courier, via the first courier device, requesting that the item be obtained from the location of pick-up and transported to the location of delivery;

receiving, from the merchant application on the merchant computing device, via the one or more APIs integrated into the merchant application, a request for a delivery status of the item, wherein the request is received based on an input via a first user interface presented by the merchant application on the merchant computing device;

receiving further location information for the first courier device;

determining a delivery status of the item based at least partially on the received further location information; and sending, to the merchant application, the delivery status of the item, wherein the merchant application displays, in the first user interface, the delivery status of the item.

9. The method of claim 8, further comprising:

providing, by the merchant application on the merchant computing device, a second user interface for presentation to at least one of the customer or the merchant on a display associated with the merchant computing device;

receiving, by the merchant application on the merchant computing device and via the second user interface, a selection of the item for acquisition and information regarding at least one of the location of delivery, the location of pick-up, the requested time of pick-up, the number of items being acquired, the size of the item, whether or not the item is associated with the predetermined category, or the weight of the item;

receiving, by the merchant application on the merchant computing device, via the second user interface, a request for information regarding delivery of the item;

sending, by the merchant application on the merchant computing device, via the one or more APIs and to the service computing device, the request for information regarding delivery of the item;

receiving, by the merchant application on the merchant computing device, the delivery proposal from the service computing device;

determining, by the merchant application on the merchant computing device, that the delivery proposal is accepted; and sending, by the merchant application on the merchant computing device and via the one or more APIs, the indication of acceptance of the delivery proposal to facilitate delivery of the item.

10. The method of claim 9, further comprising:

displaying, by the merchant application on the merchant computing device, at least one of the cost for delivery of the item or the estimated amount of time for delivery of the item via the second user interface; and receiving, by the merchant application on the merchant computing device, via the second user interface an input regarding acceptance of the delivery proposal; and sending, via the one or more APIs, an indication that the delivery proposal is accepted is based at least in part on the received input regarding acceptance of the delivery proposal.

11. The method of claim 9, further comprising:

refraining, by the merchant application, from displaying the cost for delivery of the item or refraining, by the merchant application, from including the cost for delivery of the item as part of a total cost for acquiring the item;

comparing, by the merchant application, the delivery proposal to a plurality of criteria for accepting the delivery proposal, the criteria including a merchant criterion for determining that the cost for delivery is below a cost threshold, and a second criterion for determining that the estimated timing for delivery is within a timing threshold; and send, by the merchant application, automatically, via the one or more APIs integrated into the merchant application, an indication of acceptance of the delivery proposal based on determining that the criteria are met.

12. The method of claim 8, further comprising:

presenting, by the merchant application, the delivery status of the item in a first portion of the first user interface with a delivery status of one or more other items for one or more other delivery jobs;

receive, by the merchant application, via the first user interface, a selection of the delivery status of the item in the first portion of the first user interface;

send, via the one or more APIs integrated into the merchant application, a request for details of the selected delivery status of the item; and receive, from the service computing device, additional details regarding the delivery status of the item.

13. The method of claim 8, wherein the delivery proposal further indicates at least one of an estimated pick-up time for delivery of the item or an estimate drop-off time for delivery of the item.

* * * * *